United States Patent
Hamano

(10) Patent No.: US 12,379,631 B2
(45) Date of Patent: Aug. 5, 2025

(54) LIGHT ADJUSTMENT DEVICE

(71) Applicant: Japan Display Inc., Tokyo (JP)

(72) Inventor: Daisuke Hamano, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/911,923

(22) Filed: Oct. 10, 2024

(65) Prior Publication Data

US 2025/0035294 A1 Jan. 30, 2025

Related U.S. Application Data

(63) Continuation of application No. PCT/JP2023/009401, filed on Mar. 10, 2023.

(30) Foreign Application Priority Data

Apr. 19, 2022 (JP) .................................. 2022-069043

(51) Int. Cl.
*G02F 1/1347* (2006.01)
*G02F 1/13* (2006.01)
*G02F 1/1333* (2006.01)

(52) U.S. Cl.
CPC .............. *G02F 1/1347* (2013.01); *G02F 1/13* (2013.01); *G02F 1/1333* (2013.01); *G02F 1/133317* (2021.01)

(58) Field of Classification Search
CPC ................. G02F 1/1333; G02F 1/1347; G02F 1/133608; G02F 1/133308; G02F 1/133317; G02F 1/133322
See application file for complete search history.

(56) References Cited

U.S. PATENT DOCUMENTS

| | | | |
|---|---|---|---|
| 2009/0027584 A1* | 1/2009 | Han | G02F 1/133608 362/225 |
| 2009/0185097 A1* | 7/2009 | Kim | G02F 1/133608 362/633 |

(Continued)

FOREIGN PATENT DOCUMENTS

| | | |
|---|---|---|
| CN | 211454152 U | 9/2020 |
| JP | 2010-230887 A | 10/2010 |

(Continued)

OTHER PUBLICATIONS

Search Report issued in related International Patent Application No. PCT/JP2023/009401, mailed on May 23, 2023 and English translation of same. 5 pages.

*Primary Examiner* — William N Harris
(74) *Attorney, Agent, or Firm* — K&L Gates LLP

(57) ABSTRACT

According to an aspect, a light adjustment device includes: first, second, and third frames and light adjustment panels. The first frame, the second frame, and the third frame have annular shapes and are stacked in a first direction. The first frame includes a first hook that protrudes to the one side in the first direction. The second frame includes a first cutout into which the first hook is hooked, and a second hook that protrudes to the one side in the first direction. The third frame includes a second cutout into which the second hook is hooked. The first hook does not overlap the second hook when viewed in the first direction. One of the light adjustment panels is disposed between the first frame and the second frame, and another of the light adjustment panels is disposed between the second frame and the third frame.

10 Claims, 20 Drawing Sheets

(56) References Cited

U.S. PATENT DOCUMENTS

| | | | |
|---|---|---|---|
| 2010/0097551 A1* | 4/2010 | Yamagishi | G02F 1/13471 445/24 |
| 2010/0149444 A1 | 6/2010 | Hikmet et al. | |
| 2020/0041852 A1 | 2/2020 | Hikmet et al. | |
| 2021/0318575 A1 | 10/2021 | Hasegawa et al. | |
| 2022/0252934 A1 | 8/2022 | Hasegawa et al. | |
| 2022/0269116 A1* | 8/2022 | Deng | G02F 1/133531 |
| 2024/0385483 A1* | 11/2024 | Koito | G02F 1/13471 |

FOREIGN PATENT DOCUMENTS

| | | |
|---|---|---|
| JP | 2012-242577 A | 12/2012 |
| JP | 2014-160277 A | 9/2014 |
| JP | 2021-168248 A | 10/2021 |

* cited by examiner

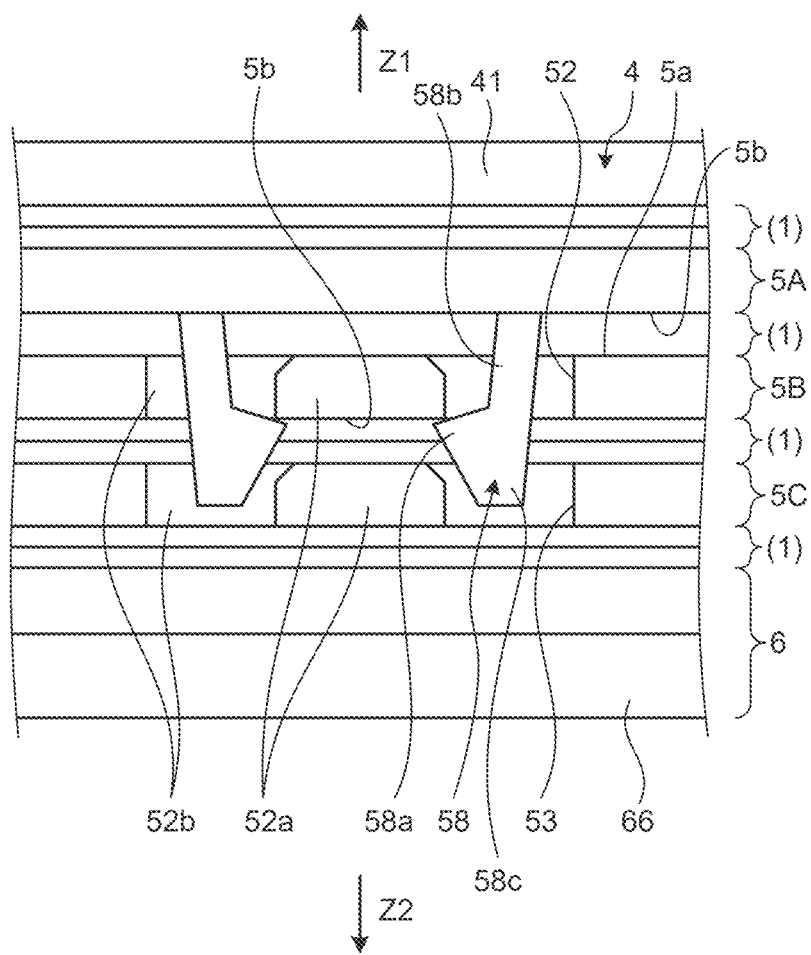

LIGHT ADJUSTMENT DEVICE

CROSS-REFERENCE TO RELATED APPLICATION

This application claims the benefit of priority from Japanese Patent Application No. 2022-069043 filed on Apr. 19, 2022 and International Patent Application No. PCT/JP2023/009401 filed on Mar. 10, 2023, the entire contents of which are incorporated herein by reference.

BACKGROUND

1. Technical Field

What is disclosed herein relates to a light adjustment device.

2. Description of the Related Art

A light adjustment device including a plurality of stacked light adjustment panels is disclosed in Japanese Patent Application Laid-open Publication No. 2010-230887 and Japanese Patent Application Laid-open Publication No. 2014-160277. When incident light enters the light adjustment panel, the light transmittance of the incident light is adjusted in the light adjustment panel and the transmitted light thus adjusted is output from the light adjustment device. In the light adjustment device, light adjustment panels vertically adjacent to each other are joined together through an optical bonding agent (light-transmitting bonding agent) such as OCA.

When a plurality of light adjustment panels are stacked, a positional misalignment potentially occurs to each light adjustment panel in a direction intersecting the stacking direction. In this case, an active area (light transmission region) is small when the light adjustment device is viewed in the up-down direction, which is not preferable.

SUMMARY

According to an aspect, a light adjustment device includes: a first frame; a second frame; a third frame; and a plurality of light adjustment panels. The first frame, the second frame, and the third frame have annular shapes and are stacked in a first direction, and the number of the second frames is at least one. The second frame is disposed on one side in the first direction relative to the first frame, and the third frame is disposed on the one side in the first direction relative to the second frame. The first frame includes a first hook that protrudes to the one side in the first direction. The second frame includes a first cutout into which the first hook is hooked, and a second hook that protrudes to the one side in the first direction. The third frame includes a second cutout into which the second hook is hooked. The first hook does not overlap the second hook when viewed in the first direction. One of the light adjustment panels is disposed between the first frame and the second frame, and another of the light adjustment panels is disposed between the second frame and the third frame.

BRIEF DESCRIPTION OF THE DRAWINGS

FIG. 20 is an enlarged schematic diagram of part of a side surface in FIG. 1.

DETAILED DESCRIPTION

Figure 1:
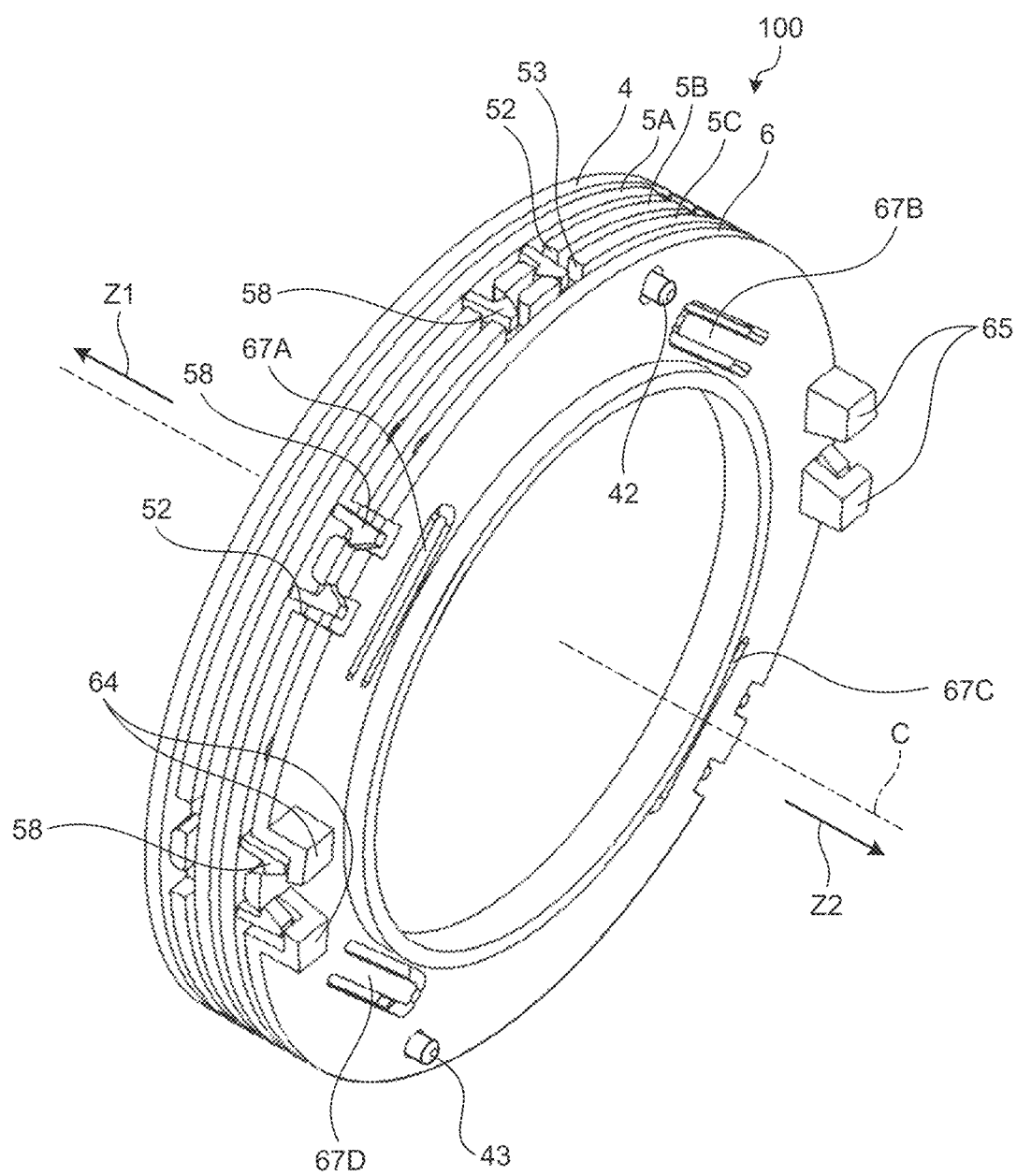
FIG. 1 is a schematic perspective view of a light adjustment device according to an embodiment when viewed from the lower side.

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate.

What is disclosed herein is merely exemplary, and any modification that could be easily thought of by the skilled person in the art as appropriate without departing from the gist of the disclosure is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and drawings, any element same as that already described with reference to an already described drawing is denoted by the same reference sign, and detailed description thereof is omitted as appropriate in some cases.

In an XYZ coordinate system illustrated in the drawings, a Z direction is a stacking direction (up-down direction or first direction). A Z1 side is opposite a Z2 side. The Z2 side is also referred to as one side in the first direction or a lower side, and the Z1 side is also referred to as the other side in the first direction or an upper side. An X direction intersects (orthogonal to) the Z direction. An X1 side is opposite an X2 side. A Y direction intersects (orthogonal to) the Z direction and the X direction. A Y1 side is opposite a Y2 side.

Figure 2:
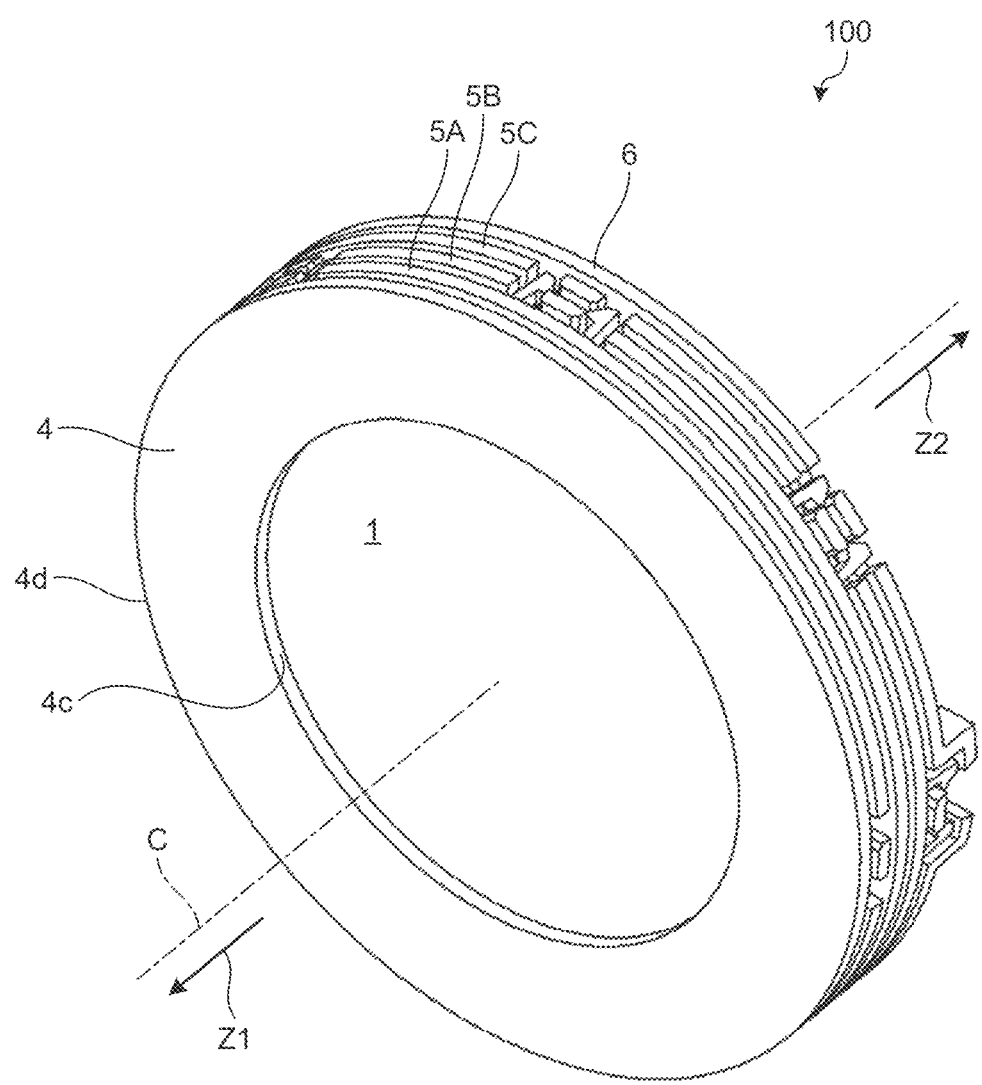
FIG. 2 is a schematic perspective view of the light adjustment device according to the embodiment when viewed from the upper side.
Figure 3:
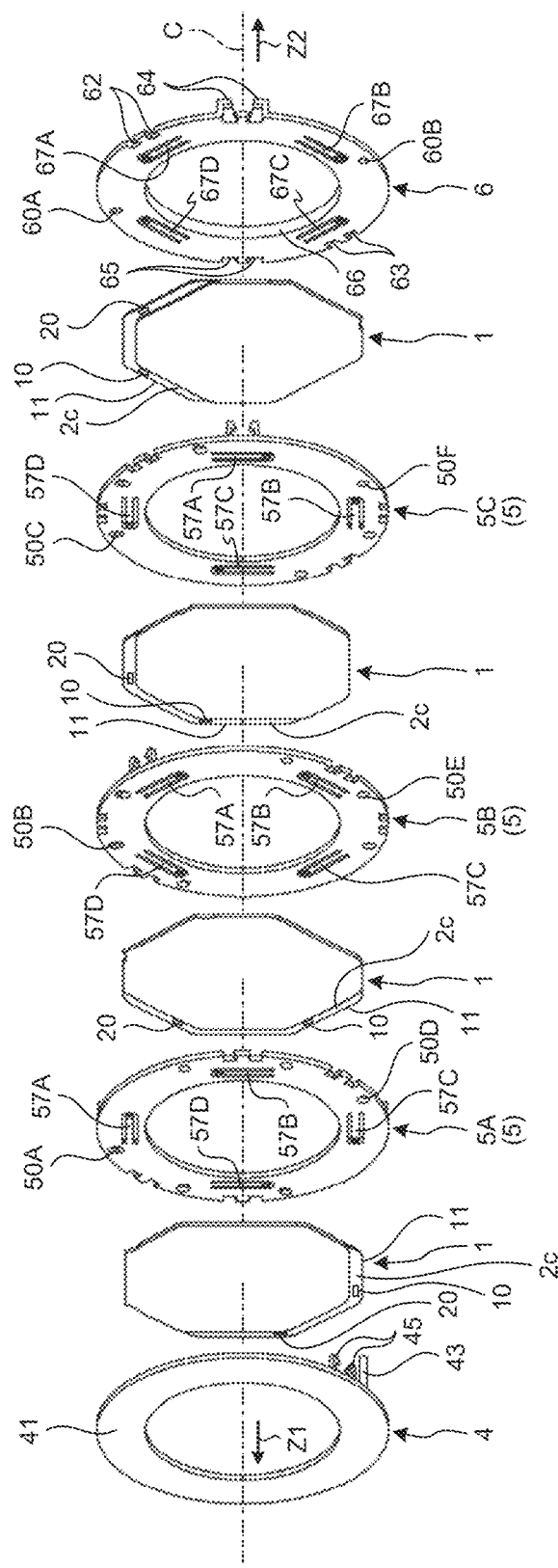
FIG. 3 is an exploded perspective view of the light adjustment device according to the embodiment.
Figure 4:
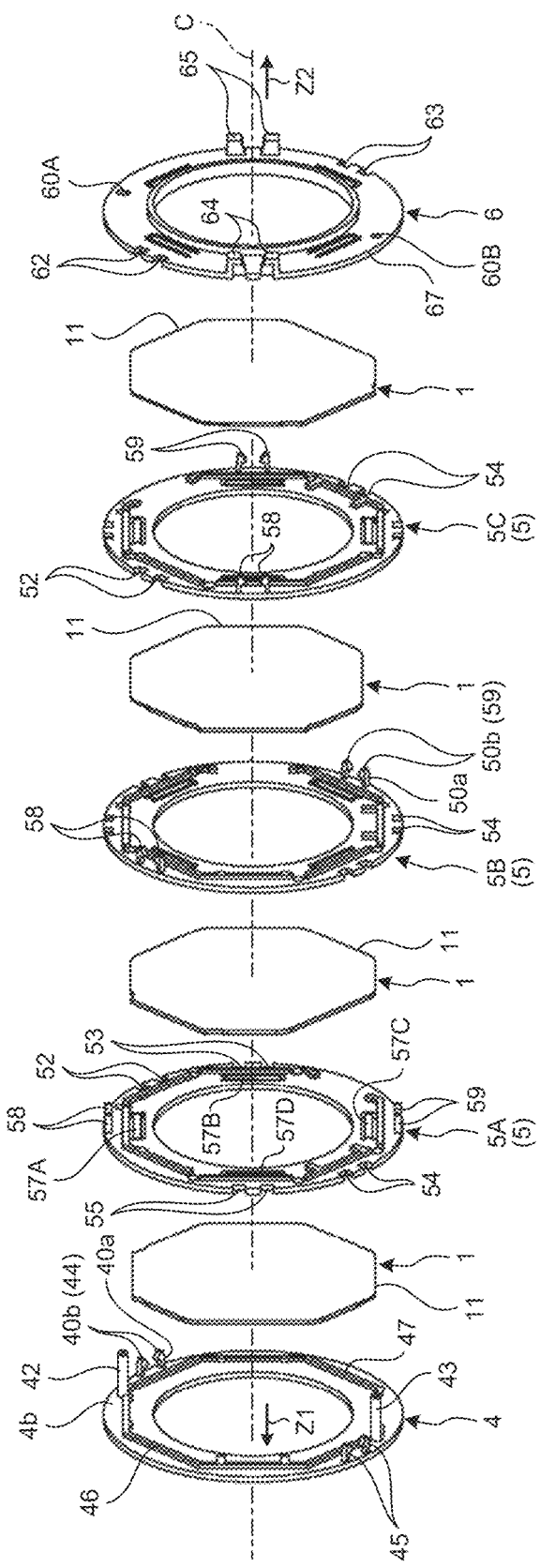
FIG. 4 is an exploded perspective view of the light adjustment device according to the embodiment.
Figure 5:
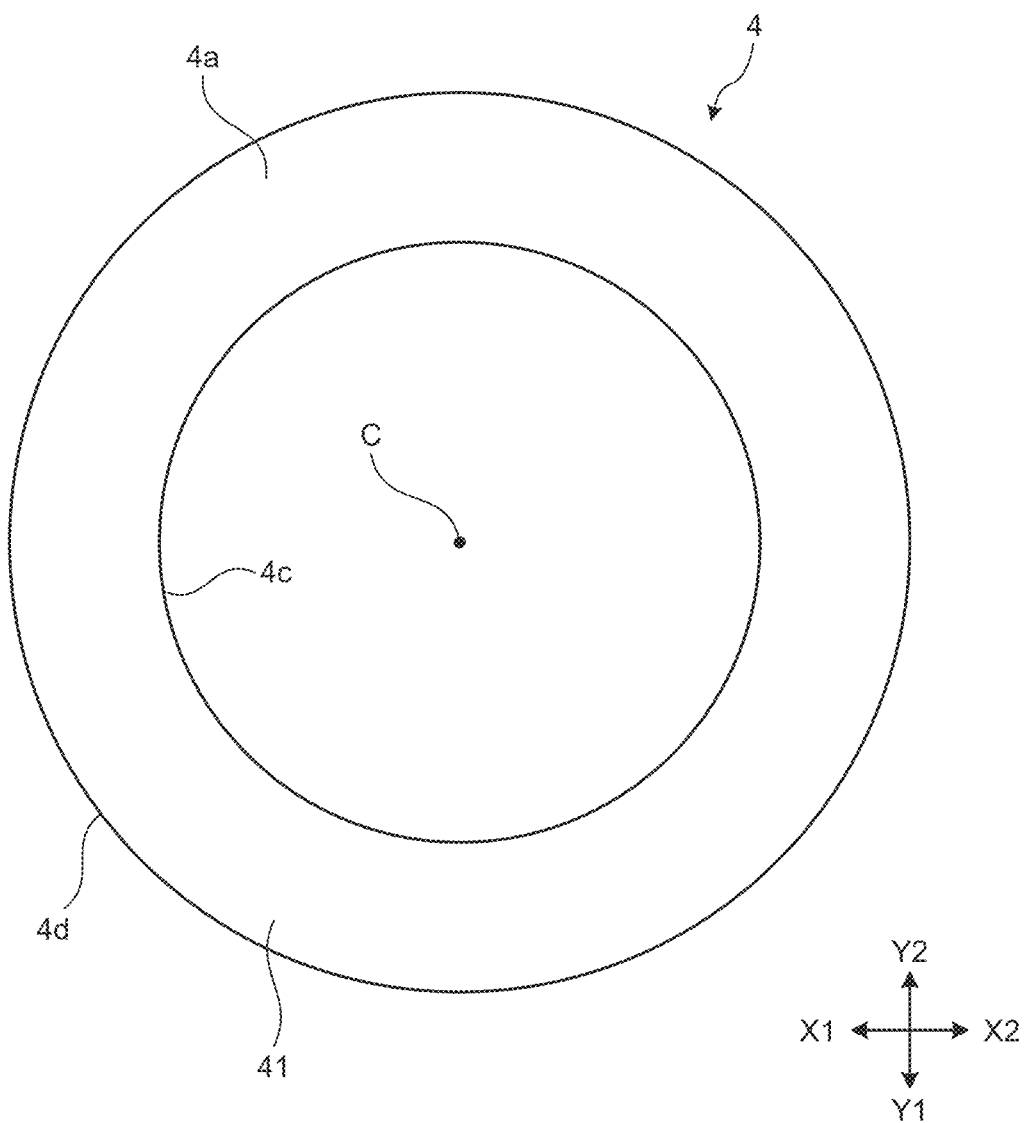
FIG. 5 is a schematic diagram of a first frame according to the embodiment when viewed from the upper side.
Figure 6:
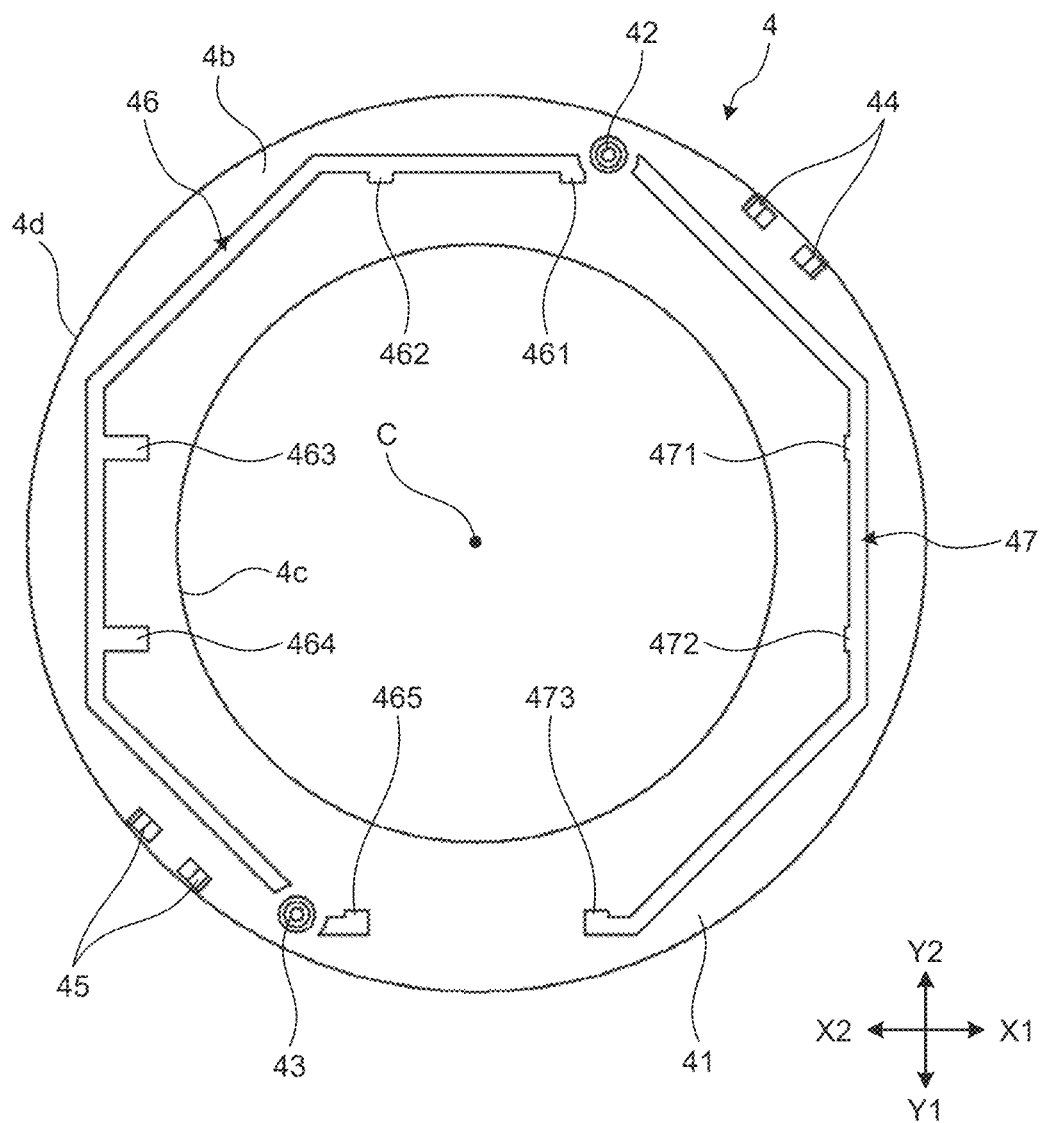
FIG. 6 is a schematic diagram of the first frame according to the embodiment when viewed from the lower side.
Figure 7:
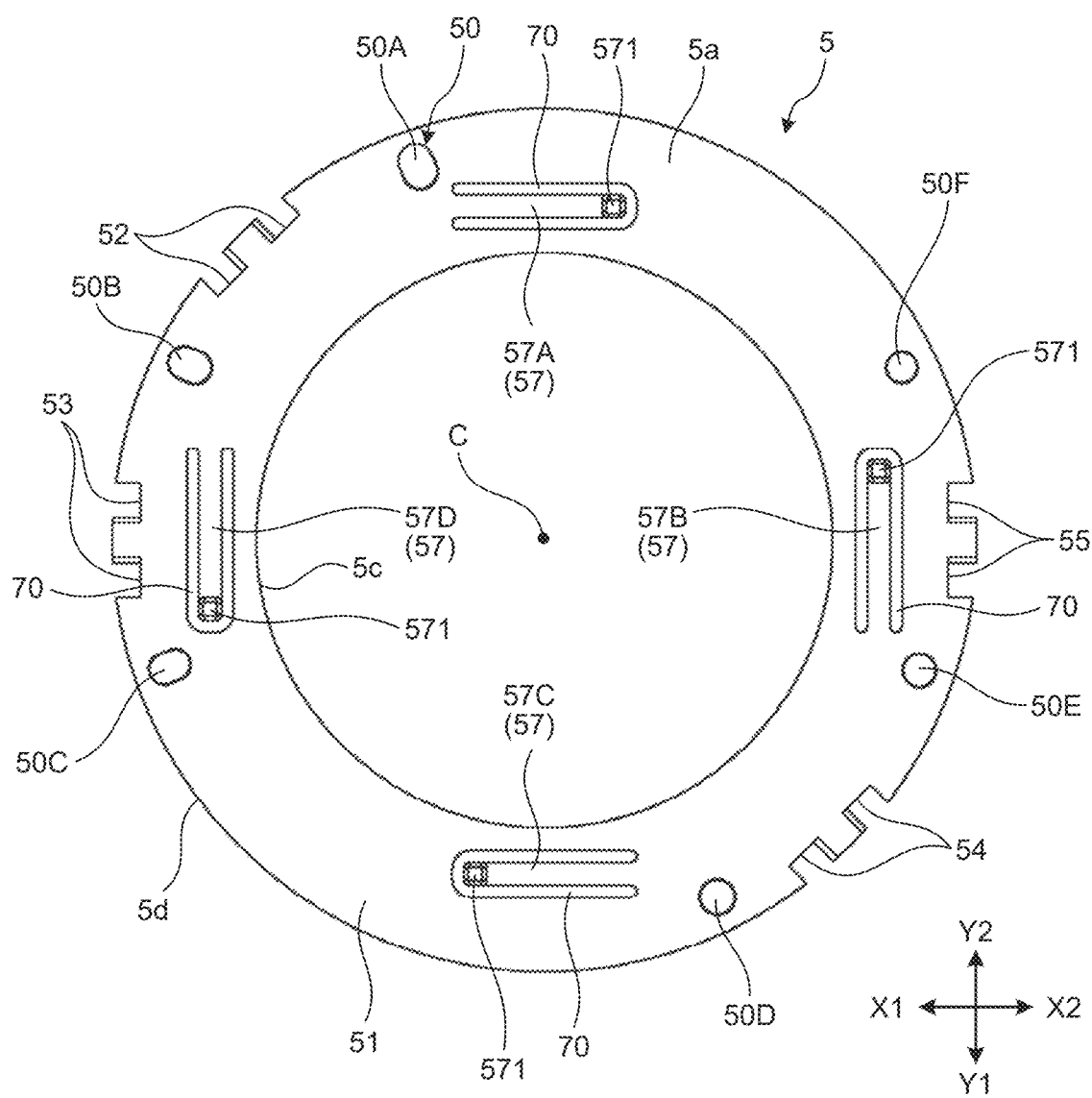
FIG. 7 is a schematic diagram of a second frame according to the embodiment when viewed from the upper side.
Figure 8:
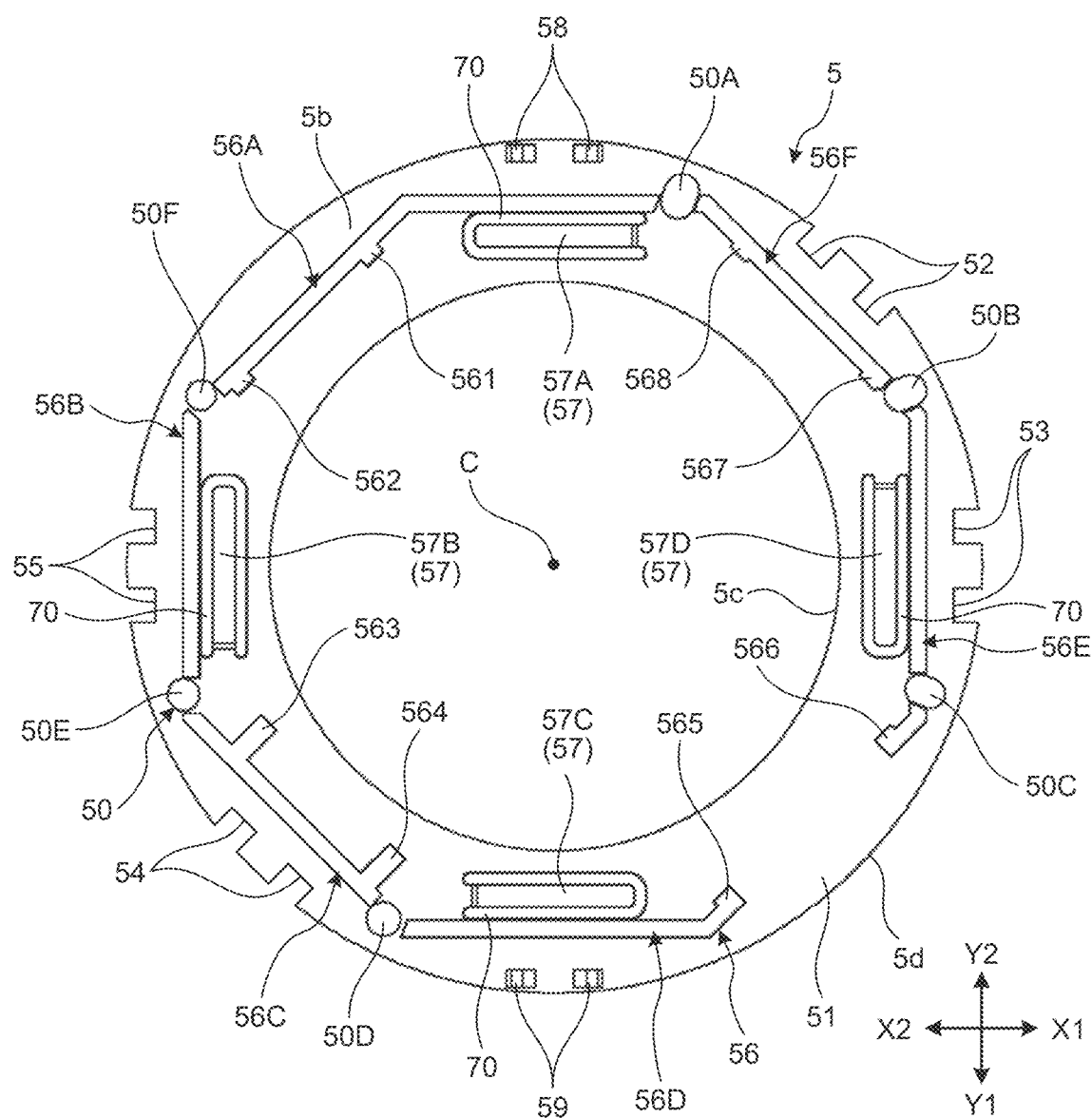
FIG. 8 is a schematic diagram of the second frame according to the embodiment when viewed from the lower side.
Figure 9:
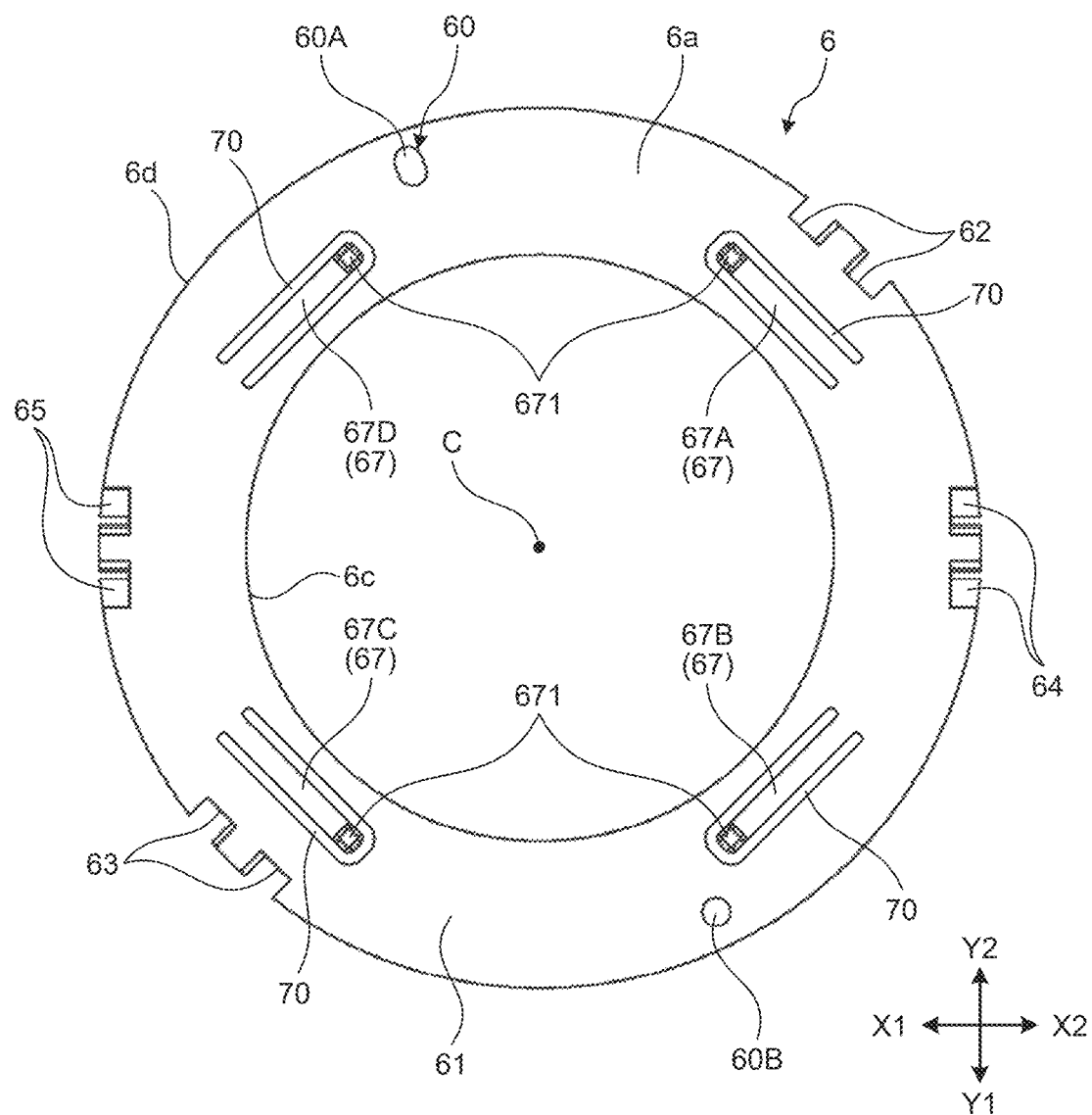
FIG. 9 is a schematic diagram of a third frame according to the embodiment when viewed from the upper side.
Figure 10:
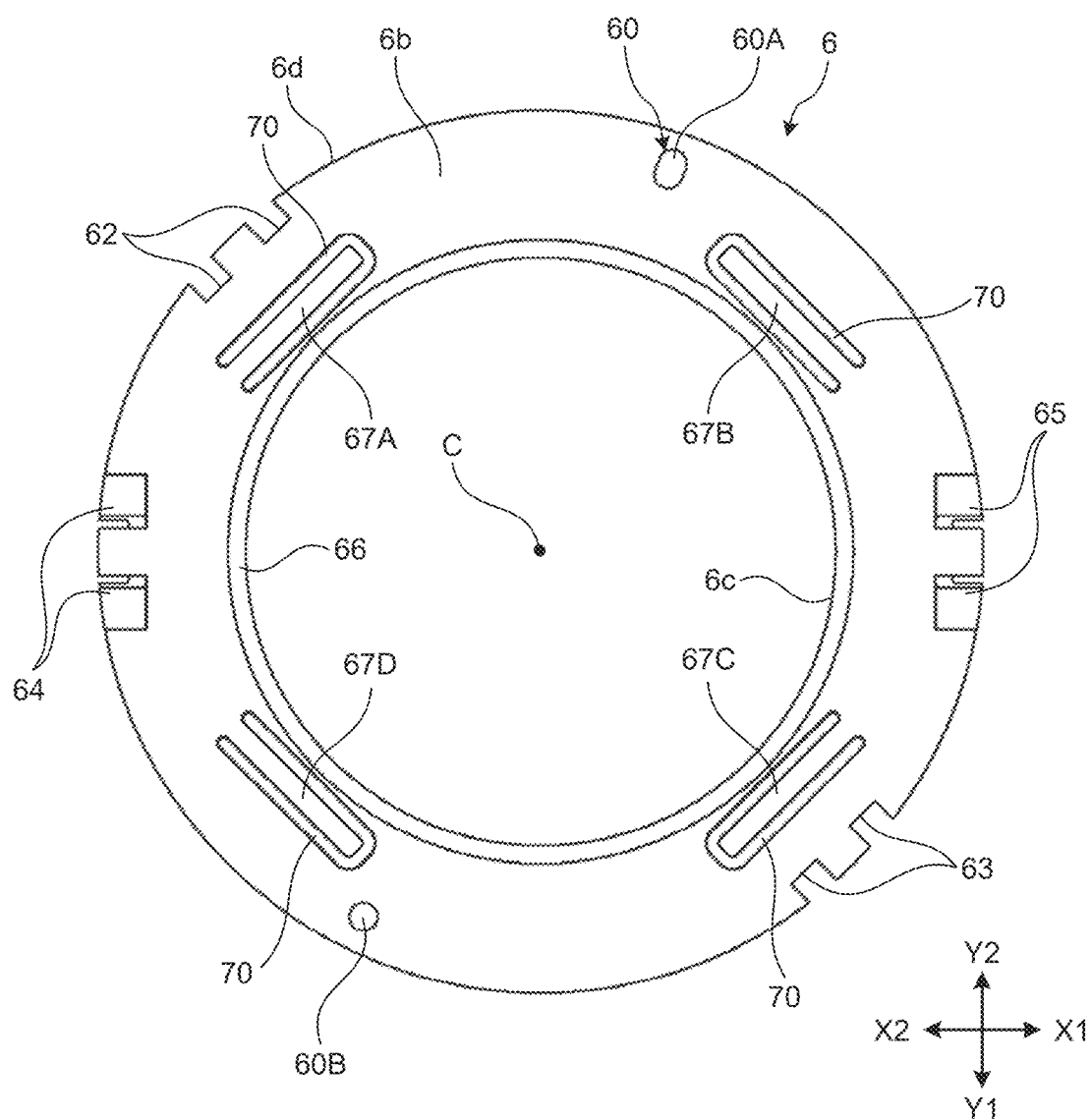
FIG. 10 is a schematic diagram of the third frame according to the embodiment when viewed from the lower side.
Figure 11:
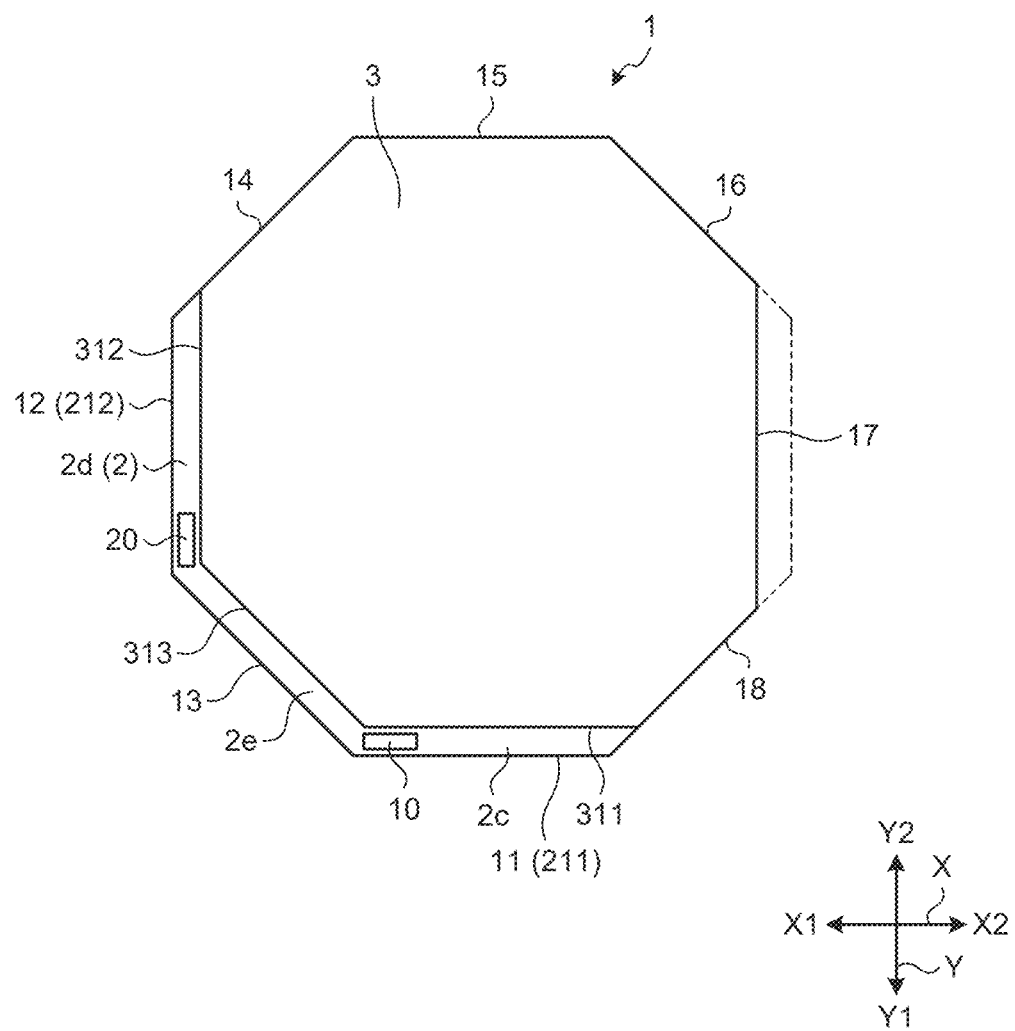
FIG. 11 is a schematic diagram of a light adjustment panel according to the embodiment when viewed from the upper side.
Figure 12:
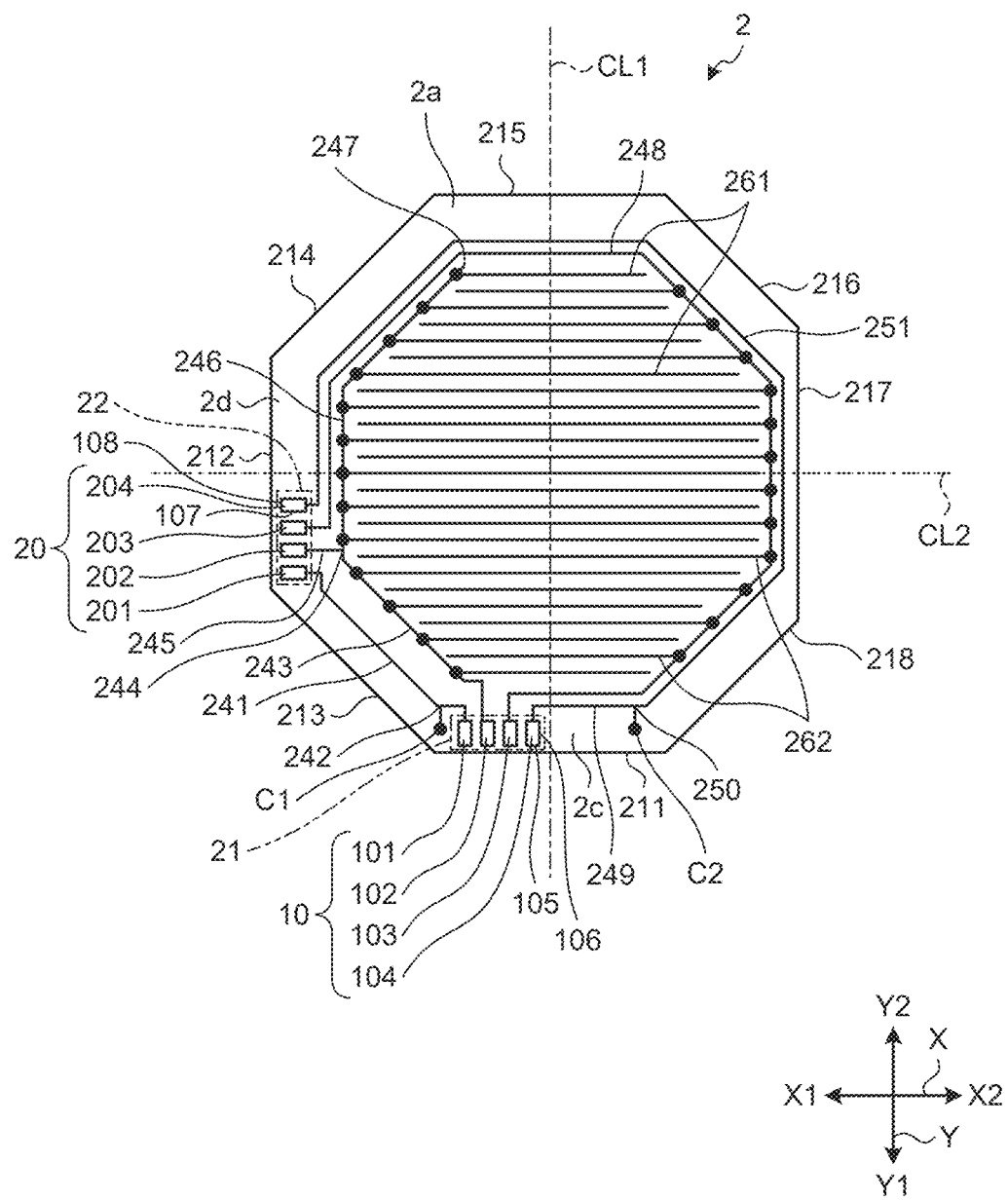
FIG. 12 is a schematic diagram of a lower substrate of the light adjustment panel according to the embodiment when viewed from the upper side.
Figure 13:
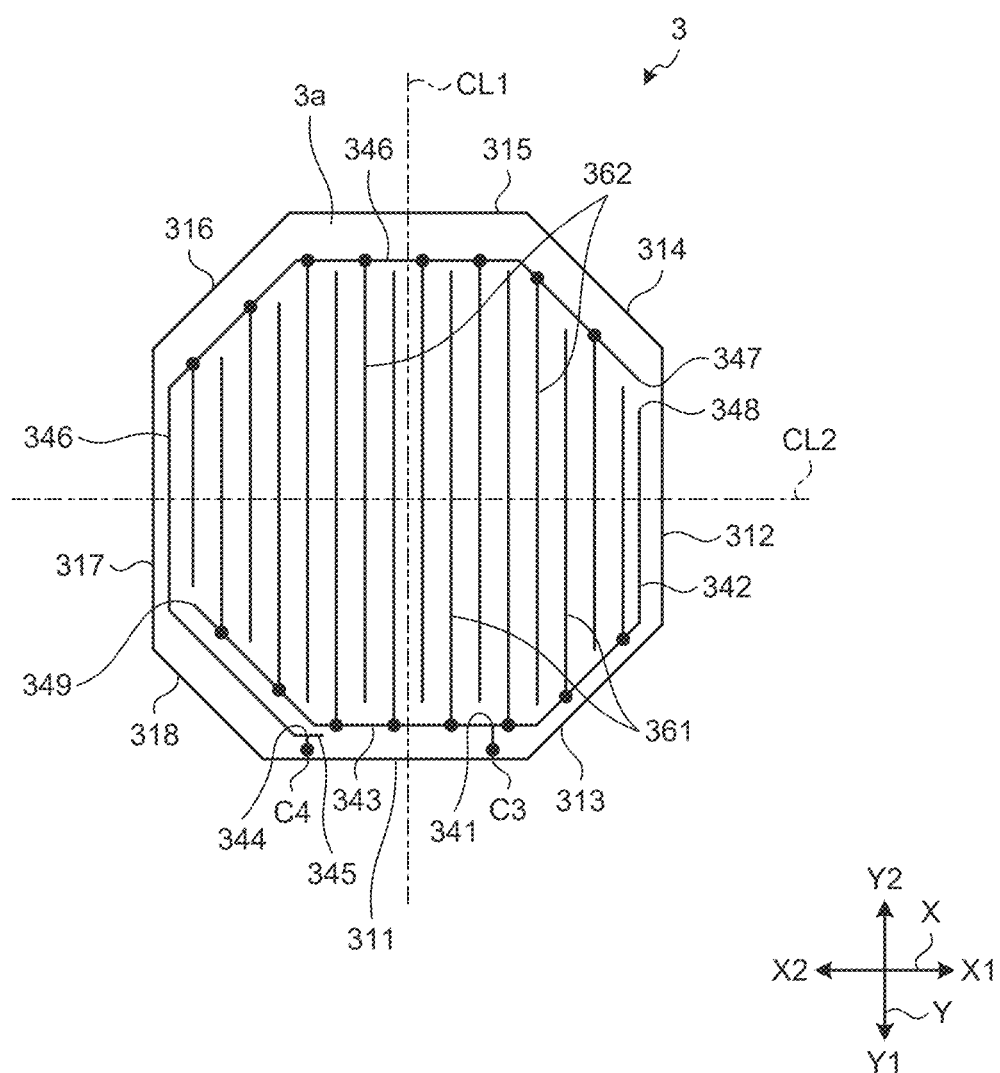
FIG. 13 is a schematic diagram of an upper substrate of the light adjustment panel according to the embodiment when viewed from the upper side.

The following describes a light adjustment device according to an embodiment. FIG. 1 is a schematic perspective view of the light adjustment device according to the embodiment when viewed from the lower side. FIG. 2 is a schematic perspective view of the light adjustment device according to the embodiment when viewed from the upper side. FIG. 3 is an exploded perspective view of the light adjustment device according to the embodiment. FIG. 4 is an exploded perspective view of the light adjustment device according to the embodiment. FIG. 5 is a schematic diagram of a first frame according to the embodiment when viewed from the upper side. FIG. 6 is a schematic diagram of the first frame according to the embodiment when viewed from the lower side. FIG. 7 is a schematic diagram of a second frame according to the embodiment when viewed from the upper side. FIG. 8 is a schematic diagram of the second frame according to the embodiment when viewed from the lower side. FIG. 9 is a schematic diagram of a third frame according to the embodiment when viewed from the upper side. FIG. 10 is a schematic diagram of the third frame according to the embodiment when viewed from the lower side. FIG. 11 is a schematic diagram of a light adjustment panel according to the embodiment when viewed from the upper side. FIG. 12 is a schematic diagram of a lower substrate of the light adjustment panel according to the embodiment when viewed from the upper side. FIG. 13 is a schematic diagram of an upper substrate of the light adjustment panel according to the embodiment when viewed from the upper side.

As illustrated in FIGS. 1 to 4, a light adjustment device 100 includes a first frame 4, second frames 5, a third frame 6, and four light adjustment panels 1. The second frames 5 include second frames 5A, 5B, and 5C. The first frame 4, one of the light adjustment panels 1, the second frame 5A, another one of the light adjustment panels 1, the second frame 5B, another one of the light adjustment panels 1, the second frame 5C, the other one of the light adjustment panels 1, and the third frame 6 are stacked in the stated order from the Z1 side toward the Z2 side. The light adjustment device 100 has a substantially cylindrical shape as a whole. The first frame 4 is coupled to the second frame 5A with the light adjustment panel 1 sandwiched between the first frame 4 and the second frame 5A. The second frame 5A is coupled to the second frame 5B with the light adjustment panel 1 sandwiched between the second frames 5A and 5B. The second frame 5B is coupled to the second frame 5C with the light adjustment panel 1 sandwiched between the second frames 5B and 5C. The second frame 5C is coupled to the third frame 6 with the light adjustment panel 1 sandwiched between the second frame 5C and the third frame 6. The color of the first frame 4, the second frames 5A, 5B, and 5C, and the third frame 6 is, for example, black. Accordingly, light-shielding performance of the frames is improved and a light-shielding region (frame region) is more clearly formed. Detailed description is given below.

As illustrated in FIGS. 5 and 6, the first frame 4 has an annular shape centered at a center C when viewed in the Z direction. The first frame 4 includes an annular plate 41, a first rod 42 (rod), a second rod 43 (rod), protruding parts 46 and 47, and first hooks 44 and 45.

As illustrated in FIGS. 5 and 6, the annular plate 41 is a plate member in an annular shape when viewed in the Z direction. Accordingly, an inner peripheral surface $4c$ and an outer peripheral surface $4d$ are circular when viewed in the Z direction. A front surface $4a$ is a smooth flat surface. A back surface $4b$ is a smooth flat surface provided with the first rod 42, the second rod 43, the protruding parts 46 and 47, and the first hooks 44 and 45, which protrude to the Z2 side. The inner side of the inner peripheral surface $4c$ of the first frame 4 illustrated in FIG. 2 serves as a light transmission region (active area), and a part between the outer peripheral surface $4d$ and the inner peripheral surface $4c$ of the first frame 4, that is, the annular plate 41 serves as a light-shielding region (frame region).

As illustrated in FIG. 1, the first rod 42 and the second rod 43 penetrate through the first frame 4, the second frames 5A, 5B, and 5C, and the third frame 6. As illustrated in FIG. 6, the first rod 42 is positioned opposite the second rod 43 with the center C therebetween. The protruding part 46 is disposed on the X2 side of a straight line connecting the first rod 42 and the second rod 43, and the protruding part 47 is disposed on the X1 side of the straight line. The protruding parts 46 and 47 protrude to the Z2 side. The protruding parts 46 and 47 extend in the circumferential direction with respect to the center C. Protrusions 461, 462, 463, 464, and 465 protrude toward the center C on the inner side (center C side) of the protruding part 46. The protrusions 461 and 462 are disposed on the Y2 side, the protrusions 463 and 464 are disposed on the X2 side, and the protrusion 465 is disposed on the Y1 side. Protrusions 471, 472, and 473 protrude toward the center C on the inner side (center C side) of the protruding part 47. The protrusions 471 and 472 are disposed on the X1 side, and the protrusion 473 is disposed on the Y1 side. The first hooks 44 are disposed on the outer side of the protruding part 47, and the first hooks 45 are disposed on the outer side of the protruding part 46. The first hooks 44 are positioned opposite the first hooks 45 with the center C therebetween. As illustrated in FIG. 4, the first hooks 44 and 45 each include a hook body $40a$ protruding to the Z2 side, and a protrusion $40b$ provided at a distal end of the hook body $40a$ on the Z2 side. Specifically, the first hooks 44 include the two hook bodies $40a$ and the two protrusions $40b$ that are provided at the distal ends of the hook bodies $40a$, respectively. The protrusions $40b$ face each other. The first hooks 44 and 45 are inserted into first cutouts 52 and 54, respectively, of the second frame 5A, and the protrusions $40b$ are hooked on a back surface $5b$ of the second frame 5A.

As illustrated in FIGS. 7 and 8, each second frame 5 has an annular shape centered at the center C when viewed in the Z direction. Each second frame 5 includes an annular plate 51, first cutouts 52, 53, 54, and 55, protruding parts 56, arms 57 (first arms), second hooks 58 and 59, and through-holes 50. The through-holes 50 include a plurality (in the embodiment, six) of through-holes 50A, 50B, 50C, 50D, 50E, and 50F.

As illustrated in FIGS. 7 and 8, the annular plate 51 is an annular plate member when viewed in the Z direction. Thus, an inner peripheral surface $5c$ and an outer peripheral surface $5d$ are circular when viewed in the Z direction. A front surface $5a$ is a smooth flat surface. The back surface $5b$ includes the protruding parts 56 and the second hooks 58 and 59, which protrude to the Z2 side.

As illustrated in FIG. 7, the first cutouts 52, the first cutouts 53, the first cutouts 54, and the first cutouts 55 are provided at an edge of the annular plate 51. Specifically, the first cutouts 52, the first cutouts 53, the first cutouts 54, and the first cutouts 55 are provided in this order along the counterclockwise direction when viewed from the Z1 side. Each cutout opens outward in the radial direction. The first cutouts 52 are positioned opposite the first cutouts 54 with the center C therebetween. The first cutouts 53 are positioned opposite the first cutouts 55 with the center C therebetween. The circumferential distance between the first cutouts 52 and 53 is substantially equal to the circumferential distance between the first cutouts 54 and 55. The circumferential distance between the first cutouts 53 and 54 is substantially equal to the circumferential distance between the first cutouts 55 and 52. The circumferential distance between the first cutouts 52 and 53 is shorter than the circumferential distance between the first cutouts 53 and 54.

As illustrated in FIG. 7, four arms 57 are provided at equal intervals along the circumferential direction of the annular plate 51. However, the number of arms 57 is not limited but may be, for example, two or three at equal intervals along the circumferential direction. Slits 70 are provided around the arms 57. One end part of each arm 57 in its longitudinal direction is connected to the annular plate 51, and the other end part is provided with a protrusion 571. The longitudinal direction of each arm 57 is along the circumferential direction. Accordingly, the other end part of each arm 57 in the longitudinal direction can swing in the Z direction. In other words, the other end part of each arm 57 in the longitudinal direction is elastically deformable in the Z direction with a supporting point at the one end part. An end of the protrusion 571 on the Z1 side is positioned on the Z1 side (near side in the sheet of FIG. 7) with respect to the front surface 5a of the annular plate 51. With this configuration, the protrusion 571 can contact the light adjustment panel 1 when the light adjustment panel 1 is fitted to the second frame 5.

As illustrated in FIG. 7, an arm 57A is positioned on the Y2 side in the annular plate 51. An arm 57B is positioned on the X2 side in the annular plate 51. An arm 57C is positioned on the Y1 side in the annular plate 51. An arm 57D is positioned on the X1 side in the annular plate 51. The first cutouts 52 are positioned between the arms 57A and 57D in the circumferential direction. The arm 57D and the first cutouts 53 are provided alongside in the radial direction. The first cutouts 54 are positioned between the arms 57B and 57C in the circumferential direction. The arm 57B and the first cutouts 55 are provided alongside in the radial direction.

As illustrated in FIG. 7, the through-holes 50A, 50B, and 50C are positioned on the X1 side of a straight line extending in the Y direction through the center C, and the through-holes 50D, 50E, and 50F are positioned on the X2 side thereof. The through-holes 50A, 50B, and 50C are ellipses having a longer axis in the radial direction. The through-holes 50A, 50B, and 50C are disposed at equal intervals. Specifically, on a circle centered at the center C and connecting the through-holes 50A, 50B, and 50C, the through-holes 50A and 50B are separated from each other by the central angle of 45°, and the through-holes 50B and 50C are separated from each other by the central angle of 45°. The first cutouts 52 are positioned between the through-holes 50A and 50B in the circumferential direction. The first cutouts 53 are positioned between the through-holes 50B and 50C in the circumferential direction.

As illustrated in FIG. 7, the through-holes 50D, 50E, and 50F are circles. The through-holes 50D, 50E, and 50F are disposed at equal intervals. Specifically, on a circle centered at the center C and connecting the through-holes 50D, 50E, and 50F, the through-holes 50D and 50E are separated from each other by the central angle of 45°, and the through-holes 50E and 50F are separated from each other by the central angle of 45°. The first cutouts 54 are positioned between the through-holes 50D and 50E in the circumferential direction. The first cutouts 55 are positioned between the through-holes 50E and 50F in the circumferential direction.

As illustrated in FIG. 8, the back surface 5b of the annular plate 51 includes the second hooks 58 and 59 and the protruding parts 56. The second hooks 58 are positioned opposite the second hooks 59 with the center C therebetween. The second hooks 58 are positioned at an end part of the annular plate 51 on the Y2 side. The second hooks 59 are positioned at an end part of the annular plate 51 on the Y1 side. The second hooks 58 and 59 each include a hook body 50a protruding to the Z2 side, and a protrusion 50b provided at a distal end of the hook body 50a on the Z2 side. Specifically, the second hooks 58 include the two hook bodies 50a and the two protrusions 50b that are provided at the distal ends of the hook bodies 50a, respectively. The protrusions 50b face each other. The second hooks 58 and 59 are inserted into cutouts of a frame adjacent thereto on the Z2 side in the Z direction, and the protrusions 50b are hooked on the back surface of the frame. For example, the second hooks 59 of the second frame 5B are inserted into the first cutouts 54 of the second frame 5C, and the protrusions 50b are hooked on the back surface 5b of the second frame 5C.

As illustrated in FIG. 8, the protruding parts 56 include protruding parts 56A, 56B, 56C, 56D, 56E, and 56F. The protruding part 56A is provided with protrusions 561 and 562. The protruding part 56B is positioned on the X2 side on the annular plate 51. The through-hole 50F is positioned on the Y2 side of the protruding part 56B, and the through-hole 50E is positioned on the Y1 side of the protruding part 56B. The through-hole 50E is positioned between the protruding parts 56C and 56B, and the through-hole 50D is positioned between the protruding parts 56C and 56D. The protruding part 56C is provided with protrusions 563 and 564. The protruding part 56D is provided with a protrusion 565. The protruding part 56E is positioned on the X1 side on the annular plate 51. The protruding part 56E is provided with a protrusion 566. The protruding part 56F is provided with protrusions 567 and 568.

As illustrated in FIGS. 9 and 10, the third frame 6 has an annular shape centered at the center C when viewed in the Z direction. The third frame 6 includes an annular plate 61, second cutouts 62 and 63, hook housing parts 64, hook housing parts 65, a protruding part 66, arms 67 (second arms), and through-holes 60. The through-holes 60 include a through-hole 60A and a through-hole 60B.

The annular plate 61 is an annular plate member when viewed in the Z direction. Accordingly, an inner peripheral surface 6c and an outer peripheral surface 6d are circular when viewed in the Z direction. A back surface 6b includes the hook housing parts 64 and 65 protruding to the Z2 side. The inner side of the inner peripheral surface 6c of the third frame 6 serves as a light transmission region, a part between the outer peripheral surface 6d and the inner peripheral surface 6c of the third frame 6, that is, the annular plate 61 serves as a light-shielding region (frame region). The protruding part 66 protrudes from the inner peripheral surface 6c to the Z2 side. The protruding part 66 annularly extends in the circumferential direction with reference to the center C.

As illustrated in FIG. 9, the second cutouts 62 and 63 are provided at the outer peripheral edge of the annular plate 61. Distal ends of the second hooks 58 and 59 of the second frame 5B are inserted into the second cutouts 62 and 63. The second cutouts 62 are positioned opposite the second cutouts 63 with the center C therebetween when viewed in the Z direction. The second cutouts 62 are positioned on the X2 side and the Y2 side at the edge of the annular plate 61. The second cutouts 63 are positioned on the X1 side and the Y1 side at the edge of the annular plate 61. The through-hole 60A is elliptical and provided on the Y2 side in the annular plate 61. The through-hole 60B is circular and provided on the Y1 side in the annular plate 61. The through-hole 60B is positioned opposite the through-hole 60A with the center C therebetween.

As illustrated in FIG. 9, four arms 67 are provided at equal intervals along the circumferential direction of the annular plate 61. However, the number of arms 67 is not limited but may be, for example, two or three at equal intervals along the circumferential direction. Slits 70 are provided around the arms 67. One end part of each arm 67 in the longitudinal direction is connected to the annular plate 61, and the other end part is provided with a protrusion 671. The longitudinal direction of each arm 67 is along the circumferential direction. The other end part of each arm 67 in the longitudinal direction can swing in the Z direction. In other words, the other end part of each arm 67 in the longitudinal direction is elastically deformable in the Z direction with a supporting point at the one end part. An end of the protrusion 671 on the Z1 side is positioned on the Z1 side (near side in the sheet of FIG. 9) with respect to a front surface 6a of the annular plate 61. With this configuration, the protrusion 671 can contact the light adjustment panel 1 when the light adjustment panel 1 is fitted to the second frame 5C.

As illustrated in FIG. 9, an arm 67A is positioned on the Y2 side and the X2 side in the annular plate 61. The arm 67A is disposed alongside the second cutouts 62 in the radial direction. An arm 67C is positioned on the Y1 side and the X1 side in the annular plate 61. The arm 67C is disposed alongside the second cutouts 63 in the radial direction. The arm 67A is positioned opposite the arm 67C with the center C therebetween. An arm 67B is positioned on the Y1 side and the X2 side in the annular plate 61. An arm 67D is positioned on the Y2 side and the X1 side in the annular plate 61. The arm 67B is positioned opposite the arm 67D with the center C therebetween.

The following describes the light adjustment panel 1. As illustrated in FIG. 11, each light adjustment panel 1 includes a lower substrate 2 and an upper substrate 3 disposed on the upper side (Z1 side) relative to the lower substrate 2. Each light adjustment panel 1 is an octagon in a plan view and has a first side 11, a second side 12, a third side 13, a fourth side 14, a fifth side 15, a sixth side 16, a seventh side 17, and an eighth side 18. In the light adjustment panel 1, only the seventh side 17 is shifted toward the X1 side relative to a regular octagon. Specifically, in FIG. 11, dashed and double-dotted lines are virtual lines in a case where the seventh side 17 is part of a regular octagon, and the seventh side 17 is positioned on the X1 side relative to the dashed and double-dotted lines. In the present disclosure, the shape of each light adjustment panel 1 is not particularly limited. Examples of the shape include polygons other than octagons, a circle, and ellipse.

The first side 11 is positioned on the Y1 side on the light adjustment panel 1. The first side 11 is parallel to the X direction in the drawings. The first side 11 of the light adjustment panel 1 matches a first side 211 of the lower substrate 2 illustrated in FIG. 12. However, a first side 311 of the upper substrate 3 illustrated in FIG. 13 is positioned on the Y2 side with respect to the first side 211 of the lower substrate 2. Thus, as illustrated in FIG. 11, an end part 2c of the lower substrate 2 on the Y1 side is exposed when the upper substrate 3 is stacked on the upper side of the lower substrate 2. A first terminal group 10 is provided at the end part 2c.

The second side 12 is positioned on the X1 side on the light adjustment panel 1. The second side 12 is parallel to the Y direction in the drawing. The second side 12 of the light adjustment panel 1 matches a second side 212 of the lower substrate 2 illustrated in FIG. 12. However, a second side 312 of the upper substrate 3 illustrated in FIG. 13 is positioned on the X2 side with respect to the second side 212 of the lower substrate 2. Thus, as illustrated in FIG. 11, an end part 2d of the lower substrate 2 on the X1 side is exposed when the upper substrate 3 is stacked on the upper side of the lower substrate 2. A second terminal group 20 is provided at the end part 2d.

The third side 13 intersects both the X1 direction and the Y1 direction. The angle of the intersection is 45°. The third side 13 matches a third side 213 the lower substrate 2 illustrated in FIG. 12. However, a third side 313 of the upper substrate 3 illustrated in FIG. 13 is positioned on the X2 and Y2 side with respect to the third side 213 of the lower substrate 2. In other words, in a plan view, the third side 313 of the upper substrate 3 is positioned closer to the center C than the third side 213 of the lower substrate 2. Thus, as illustrated in FIG. 11, an end part 2e of the lower substrate 2 is exposed when the upper substrate 3 is stacked on the upper side of the lower substrate 2.

The fourth side 14 intersects both the X1 direction and the Y2 direction. The angle of the intersection is 45°. The fourth side 14 overlaps a fourth side 214 of the lower substrate 2 illustrated in FIG. 12 and a fourth side 314 of the upper substrate 3 illustrated in FIG. 13. The fifth side 15 is positioned on the Y2 side on the light adjustment panel 1. The fifth side 15 overlaps a fifth side 215 of the lower substrate 2 illustrated in FIG. 12 and a fifth side 315 of the upper substrate 3 illustrated in FIG. 13.

The sixth side 16 intersects both the X2 direction and the Y2 direction. The angle of the intersection is 45°. The sixth side 16 overlaps a sixth side 216 of the lower substrate 2 illustrated in FIG. 12 and a sixth side 316 of the upper substrate 3 illustrated in FIG. 13.

The seventh side 17 is positioned on the X2 side on the light adjustment panel 1. The seventh side 17 overlaps a seventh side 217 of the lower substrate 2 illustrated in FIG. 12 and a seventh side 317 of the upper substrate 3 illustrated in FIG. 13.

The eighth side 18 intersects both the X2 direction and the Y1 direction. The angle of the intersection is 45°. The eighth side 18 overlaps an eighth side 218 of the lower substrate 2 illustrated in FIG. 12 and an eighth side 318 of the upper substrate 3 illustrated in FIG. 13.

Accordingly, the area of the upper substrate 3 is smaller than the area of the lower substrate 2, and thus the first terminal group 10 provided at the end part 2c of the lower substrate 2 and the second terminal group 20 provided at the end part 2d of the lower substrate 2 are exposed.

The following describes the lower substrate 2 and the upper substrate 3 with reference to FIGS. 12 and 13. FIG. 13 is a schematic diagram illustrating a front surface 3a on which wiring lines are provided, among the front and back surfaces of the upper substrate 3. Accordingly, the X1 and X2 directions of the upper substrate 3 in FIG. 13 are the inverse of the X1 and X2 directions of the lower substrate 2 in FIG. 12. FIG. 12 illustrates a central line CL1 extending in the Y direction through the center of the lower substrate 2 in the X direction, and a central line CL2 extending in the X direction through the center of the lower substrate 2 in the Y direction. As illustrated in FIG. 12, at the end part 2c along the first side 211 of the lower substrate 2, the first terminal group 10 is provided at a first end part 21 (illustrated with dashed and double-dotted lines) closer to the second side 212 (or the third side 213) with respect to the center of the first side 211. In other words, the end part 2c is an end part of the lower substrate 2 on the Y1 side, and the first end part 21 in the end part 2c illustrated with dashed and double-dotted lines is disposed on the X1 side of the central line CL1. The first terminal group 10 is provided at the first end part 21. As illustrated in FIG. 12, the first terminal group 10 includes a first terminal 101, a second terminal 102, a third terminal 103, and a fourth terminal 104. The first terminal 101, the second terminal 102, the third terminal 103, and the fourth terminal 104 are sequentially arranged in the X direction (fourth direction) from the X1 side toward the X2 side. The terminals 101 to 104 each have a pair of short sides 105 parallel to the first side 211 and a pair of long sides 106 parallel to the second side 212.

As illustrated in FIG. 12, at the end part 2d along the second side 212 of the lower substrate 2, the second terminal group 20 is provided at a second end part 22 (illustrated with dashed and double-dotted lines) closer to the first side 211 (or the third side 213) with respect to the center of the second side 212. In other words, the end part 2d is an end part of the lower substrate 2 on the X1 side, and the second end part 22 in the end part 2d illustrated with dashed and double-dotted lines is disposed on the Y1 side of the central line CL2. The second terminal group 20 is provided at the second end part 22. As illustrated in FIG. 12, the second terminal group 20 includes a fifth terminal 201, a sixth terminal 202, a seventh terminal 203, and an eighth terminal 204. The fifth terminal 201, the sixth terminal 202, the seventh terminal 203, and the eighth terminal 204 are sequentially arranged in the front-back direction (Y direction) from the Y1 side toward the Y2 side. The terminals 201, 202, 203, and 204 each have a pair of long sides 107 parallel to the first side 211 and a pair of short sides 108 parallel to the second side 212.

The following describes wiring lines on the lower substrate 2 and the upper substrate 3. Wiring lines are provided on the front surface of each substrate of the front and back surfaces thereof. In other words, a surface on which wiring lines are provided is referred to as the front surface, and a surface opposite to the front surface is referred to as the back surface.

As illustrated in FIG. 12, wiring lines, liquid crystal drive electrodes, and coupling portions are provided on a front surface 2a of the lower substrate 2. A coupling portion C1 of the lower substrate 2 and a coupling portion C3 of the upper substrate 3 (refer to FIG. 13) are electrically coupled to each other through a conductive pillar (not illustrated) through which conduction is possible. Similarly, a coupling portion C2 of the lower substrate 2 and a coupling portion C4 of the upper substrate 3 (refer to FIG. 13) are electrically coupled to each other through a common electrode (not illustrated) through which conduction is possible.

The first terminal 101 and the fifth terminal 201 are electrically coupled to each other through a wiring line (first wiring line) 241. A bifurcation point 242 is provided on the wiring line 241, and a wiring line extends from the bifurcation point 242 to the coupling portion C1.

The second terminal 102 and the sixth terminal 202 are electrically coupled to each other through wiring lines (second wiring lines) 243 and 245. A bifurcation point 244 is provided on the wiring line 243, and a wiring line 246 extends from the bifurcation point 244 to an end 247.

The third terminal 103 and the seventh terminal 203 are electrically coupled to each other through a wiring line (third wiring line) 248. The fourth terminal 104 and the eighth terminal 204 are electrically coupled to each other through wiring lines (fourth wiring lines) 249 and 251. The wiring line 249 extends toward the X2 side up to a bifurcation point 250 from the fourth terminal 104. The wiring line 251 extends from the bifurcation point 250 to the eighth terminal 204. A wiring line extends from the bifurcation point 250 to the coupling portion C2.

A plurality of liquid crystal drive electrodes 261 are coupled to the wiring lines 243 and 246. The liquid crystal drive electrodes 261 extend straight in the X direction. The liquid crystal drive electrodes 261 are disposed at equal intervals in the Y direction.

A plurality of liquid crystal drive electrodes 262 are coupled to the wiring line 248. The liquid crystal drive electrodes 262 extend straight in the X direction. The liquid crystal drive electrodes 262 are disposed at equal intervals in the Y direction. The liquid crystal drive electrodes 261 and 262 are alternately arranged in the Y direction.

As illustrated in FIG. 13, wiring lines, liquid crystal drive electrodes, and coupling portions are provided on the front surface 3a of the upper substrate 3. The central lines CL1 and CL2 illustrated in FIG. 13 correspond to the central lines CL1 and CL2 illustrated in FIG. 12.

The coupling portion C3 is coupled to wiring lines 342 and 343 through a bifurcation point 341. The wiring line 342 extends to an end 348. The wiring line 343 extends to an end 349. The coupling portion C4 is coupled to wiring lines 345 and 346 through a bifurcation point 344. The wiring line 346 extends to an end 347.

A plurality of liquid crystal drive electrodes 361 are coupled to the wiring lines 342 and 343. The liquid crystal drive electrodes 361 extend straight in the Y direction. The liquid crystal drive electrodes 361 are disposed at equal intervals in the X direction.

A plurality of liquid crystal drive electrodes 362 are coupled to the wiring line 346. The liquid crystal drive electrodes 362 extend straight in the Y direction. The liquid crystal drive electrodes 362 are disposed at equal intervals in the X direction. The liquid crystal drive electrodes 361 and 362 are alternately arranged in the X direction.

Figure 14:
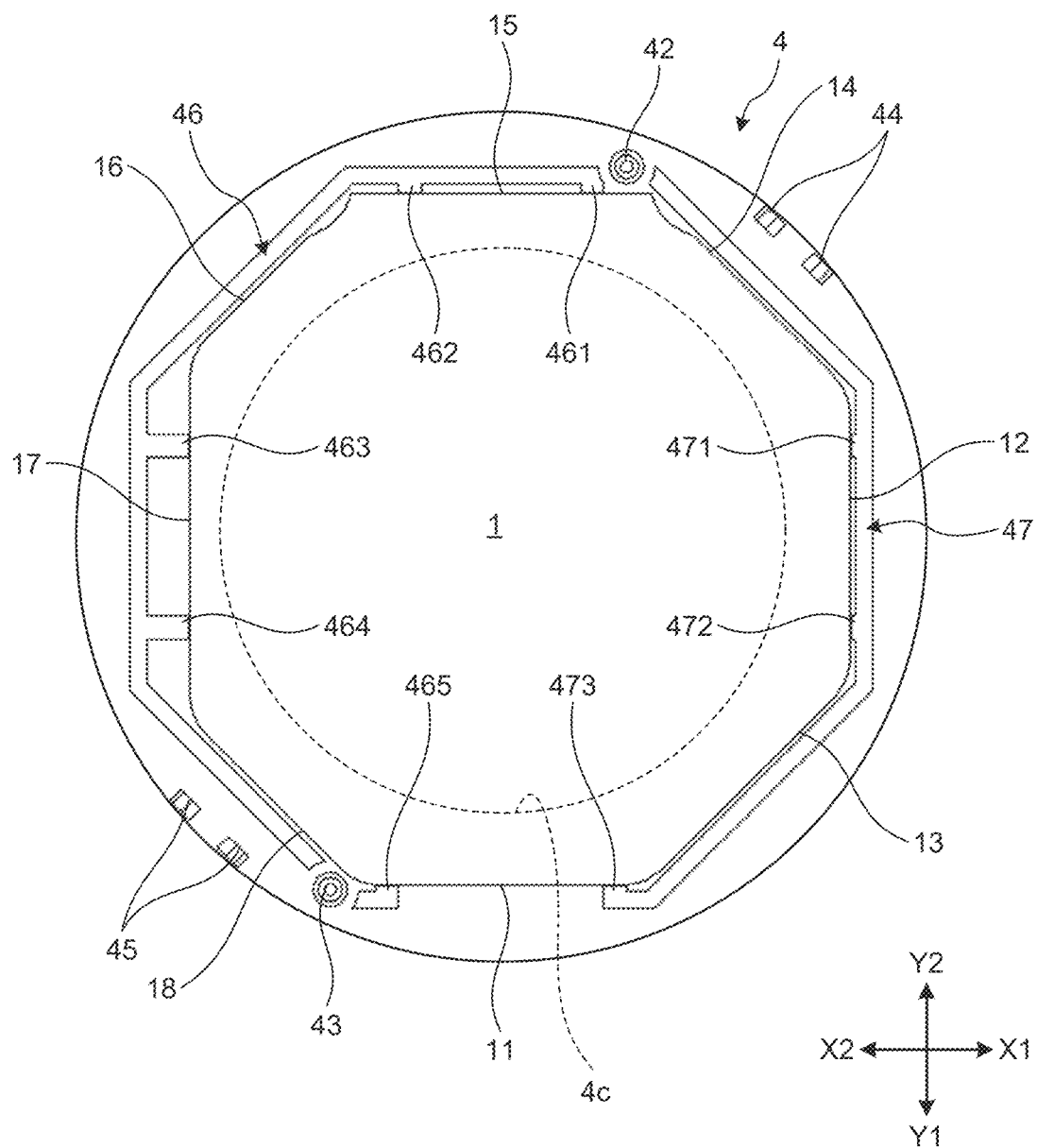
FIG. 14 is a schematic diagram of the first frame and the light adjustment panel when viewed from the lower side.
Figure 15:
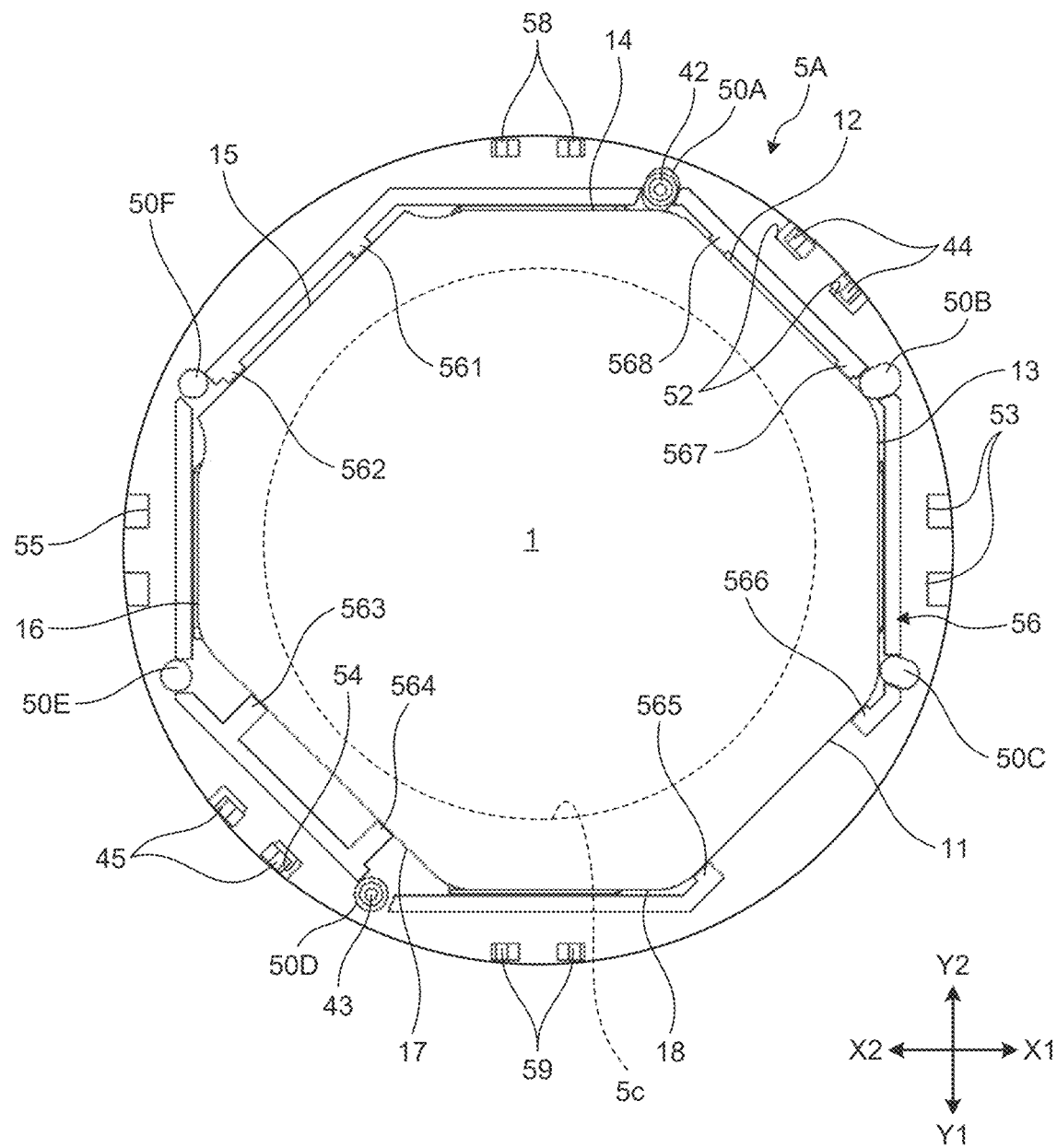
FIG. 15 is a schematic diagram of a second frame positioned uppermost among three second frames and the light adjustment panel when viewed from the lower side.
Figure 16:
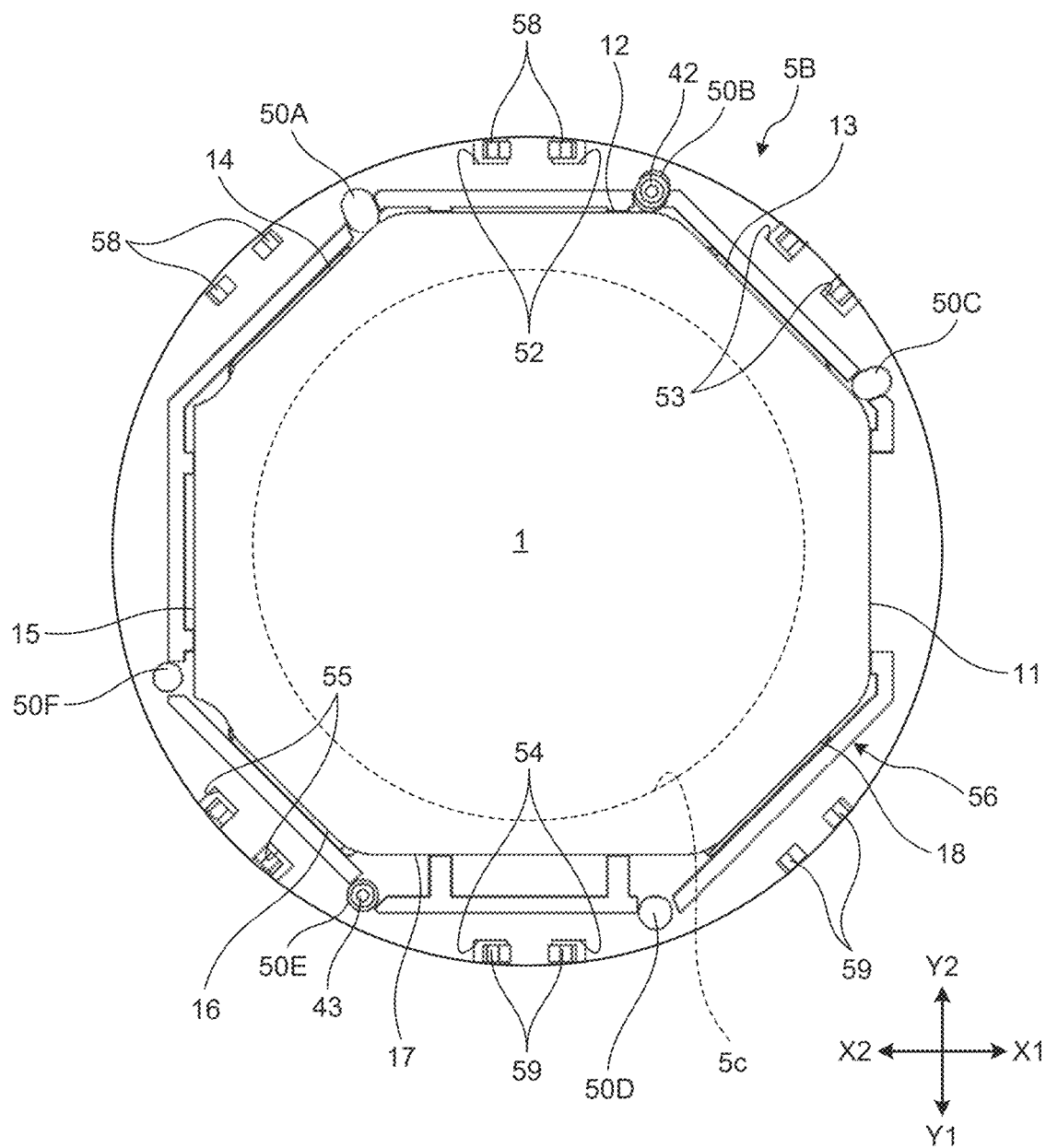
FIG. 16 is a schematic diagram of a second frame positioned second uppermost among the three second frames and the light adjustment panel when viewed from the lower side.
Figure 17:
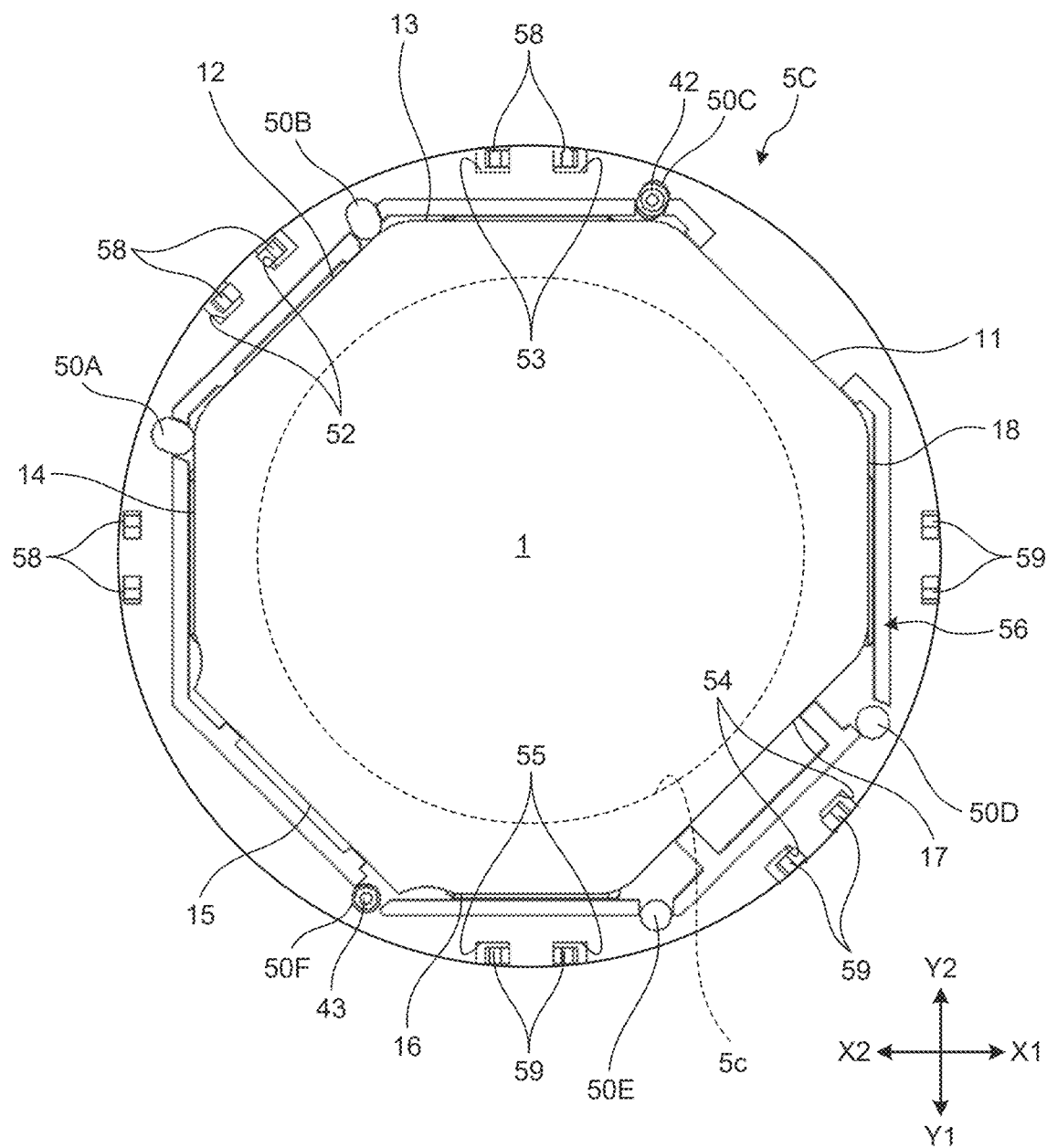
FIG. 17 is a schematic diagram of a second frame positioned lowermost among the three second frames and the light adjustment panel when viewed from the lower side.
Figure 18:
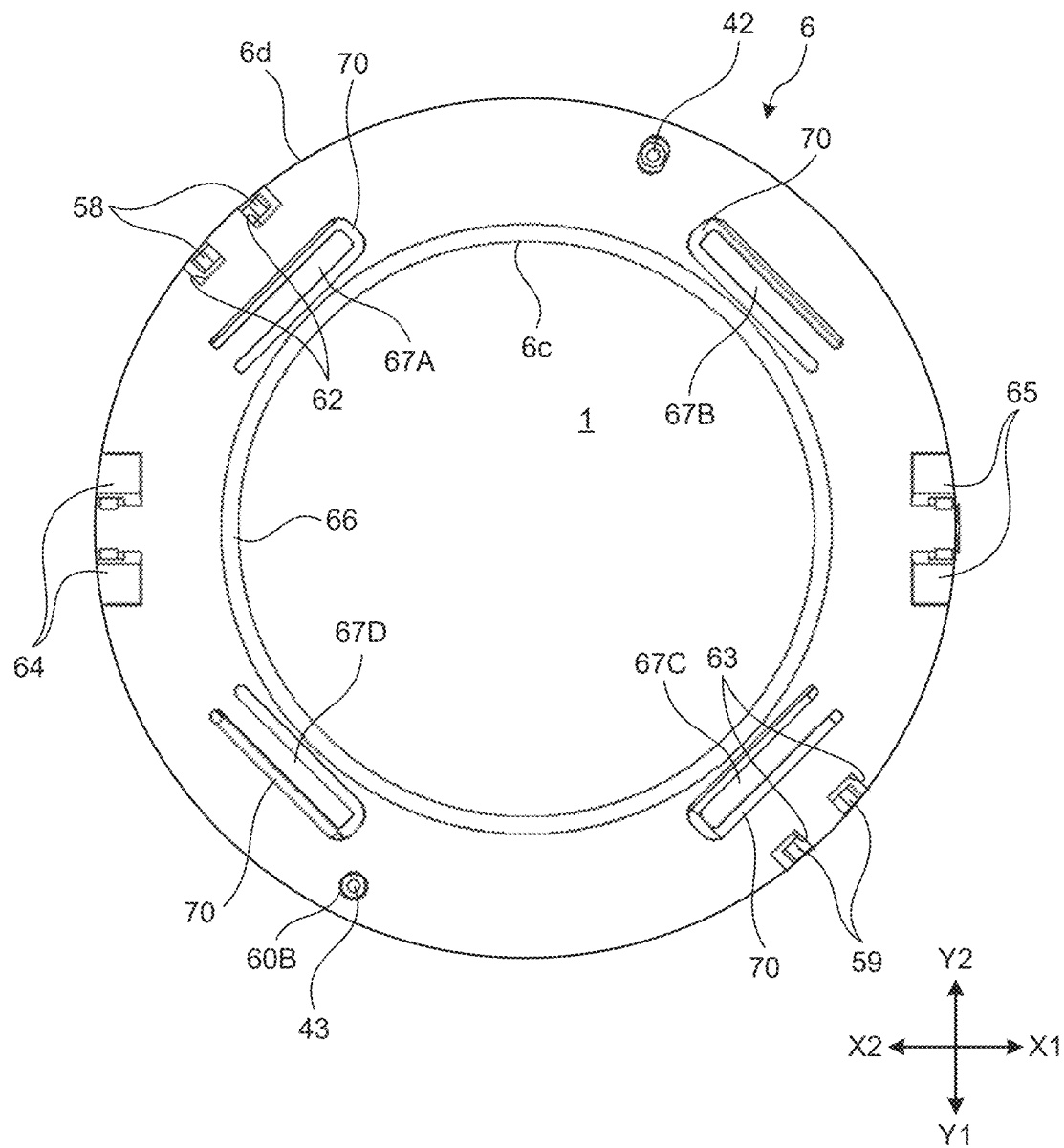
FIG. 18 is a schematic diagram of the third frame and the light adjustment panel when viewed from the lower side.

The following describes the positional relation between a frame and a light adjustment panel fitted to the frame. FIG. 14 is a schematic diagram of the first frame and a light adjustment panel when viewed from the lower side. FIG. 15 is a schematic diagram of a second frame positioned uppermost among the three second frames and a light adjustment panel when viewed from the lower side. FIG. 16 is a schematic diagram of a second frame positioned second uppermost among the three second frames and a light adjustment panel when viewed from the lower side. FIG. 17 is a schematic diagram of a second frame positioned lowermost among the three second frames and a light adjustment panel when viewed from the lower side. FIG. 18 is a schematic diagram of the third frame and a light adjustment panel when viewed from the lower side.

As illustrated in FIG. 14, the light adjustment panel 1 is fitted to the back surface 4b of the first frame 4. The protrusions 461 and 462 can contact the fifth side 15 of the light adjustment panel 1. The position of the light adjustment panel 1 on the Y2 side is regulated by the protrusions 461 and 462. The protrusions 463 and 464 can contact the seventh side 17 of the light adjustment panel 1. The position of the light adjustment panel 1 on the X2 side is regulated by the protrusions 463 and 464. The protrusions 465 and 473 can contact the first side 11 of the light adjustment panel 1. The position of the light adjustment panel 1 on the Y1 side is regulated by the protrusions 465 and 473. The protrusions 471 and 472 can contact the second side 12 of the light adjustment panel 1. The position of the light adjustment panel 1 on the X1 side is regulated by the protrusions 471 and 472. The space between the protrusions 465 and 473 is open, and thus for example, flexible printed circuits (FPC) extending in the Y direction can be disposed between the protrusions 465 and 473 and coupled to the first terminal group 10 on the light adjustment panel 1. As described above, in the light adjustment panel 1, only the seventh side 17 is shifted toward the X1 side relative to a regular octagon. Accordingly, for example, in a state in which the front and back surfaces of the light adjustment panel 1 are reversed, it is difficult to fit the light adjustment panel 1 to the first frame 4 because an outer peripheral end part of the light adjustment panel 1 interferes with and is placed on the protrusions. The protrusions 571 of the arms 57 of the second frame 5A contact the light adjustment panel 1 fitted to the first frame 4. The outer peripheral edge of the light adjustment panel 1 is protected by the protruding parts 46 and 47.

As illustrated in FIG. 15, the light adjustment panel 1 is fitted to the back surface 5b of the second frame 5A. The light adjustment panel 1 fitted to the second frame 5A is in a state of being rotated by 45° in the circumferential direction relative to the light adjustment panel 1 fitted to the first frame 4. The inner peripheral surface 5c of the second frame 5 is a circle centered at the center C, and the inner side of the inner peripheral surface 5c illustrated with a dashed line in FIG. 15 is a light transmission region. When the four light adjustment panels 1 are placed over in the Z direction, the outer peripheral edges of their light transmission regions overlap, and thus the light transmission regions have the same area as that of one light adjustment panel 1 even when the four light adjustment panels 1 are each rotated in the circumferential direction. The protrusions 561 and 562 can contact the fifth side 15 of the light adjustment panel 1. The position of the light adjustment panel 1 on the X2 side and the Y2 side is regulated by the protrusions 561 and 562. The protrusions 563 and 564 can contact the seventh side 17 of the light adjustment panel 1. The position of the light adjustment panel 1 on the X2 side and the Y1 side is regulated by the protrusions 563 and 564. The protrusions 565 and 566 can contact the first side 11 of the light adjustment panel 1. The position of the light adjustment panel 1 on the X1 side and the Y1 side is regulated by the protrusions 565 and 566.

The protrusions 567 and 568 can contact the second side 12 of the light adjustment panel 1. The position of the light adjustment panel 1 on the X1 side and the Y2 side is regulated by the protrusions 567 and 568. The space between the protrusions 565 and 566 is open, and thus, for example, flexible printed circuits can be disposed between the protrusions 565 and 566 and coupled to the first terminal group 10 on the light adjustment panel 1. Specifically, the flexible printed circuits extend toward the X1 side and the Y1 side. In a state in which the front and back surfaces of the light adjustment panel 1 are reversed, it is difficult to fit the light adjustment panel 1 to the second frame 5 (second frames 5A, 5B, and 5C) because an outer peripheral end part of the light adjustment panel 1 interferes with and is placed on the protrusions. The protrusions 571 of the arms 57 of the second frame 5B contact the light adjustment panel 1 fitted to the second frame 5A. The outer peripheral edge of the light adjustment panel 1 is protected by the protruding parts 56.

As illustrated in FIG. 16, the light adjustment panel 1 is fitted to the back surface 5b of the second frame 5B. When viewed from the Z2 side, the light adjustment panel 1 fitted to the second frame 5B is in a state of being rotated by 45° in the circumferential direction relative to the light adjustment panel 1 fitted to the second frame 5A. The second frame 5B has the same structure as the second frame 5A. When viewed from the Z2 side, the second frame 5B in FIG. 16 is equivalent to the second frame 5A in FIG. 15 being rotated by 45° in the counterclockwise direction. Thus, when viewed from the Z2 side, flexible printed circuits extend in a direction rotated by 45° in the counterclockwise direction relative to that of the flexible printed circuits in FIG. 15. Specifically, the flexible printed circuits extend in the X1 direction. The protrusions 571 of the arms 57 of the second frame 5C contact the light adjustment panel 1 fitted to the second frame 5B. The outer peripheral edge of the light adjustment panel 1 is protected by the protruding parts 56.

As illustrated in FIG. 17, the light adjustment panel 1 is fitted to the back surface 5b of the second frame 5C. When viewed from the Z2 side, the light adjustment panel 1 fitted to the second frame 5C is in a state of being rotated by 45° in the circumferential direction relative to the light adjustment panel 1 fitted to the second frame 5B. The second frame 5C has the same structure as the second frames 5A and 5B. When viewed from the Z2 side, the second frame 5C in FIG. 17 is equivalent to the second frame 5B in FIG. 16 being rotated by 45° in the counterclockwise direction. Thus, when viewed from the Z2 side, flexible printed circuits extend in a direction rotated by 45° in the counterclockwise direction relative to the flexible printed circuits in FIG. 16. Specifically, the flexible printed circuits extend toward the X1 side and the Y2 side. The protrusions 671 of the arms 67 of the third frame 6 illustrated in FIG. 18 contact the light adjustment panel 1 fitted to the second frame 5C. The outer peripheral edge of the light adjustment panel 1 is protected by the protruding parts 56.

As illustrated in FIG. 18, the light adjustment panel 1 (light adjustment panel fitted to the second frame 5C) is disposed on the Z1 side of the third frame 6. In other words, the light adjustment panel 1 (light adjustment panel fitted to the second frame 5C) is disposed between the second frame 5C and the third frame 6. As described above, the inner peripheral surface 6c of the third frame 6 is circular, the inner side of the inner peripheral surface 6c serves as a light transmission region (active area), and the part between the outer peripheral surface 6d and the inner peripheral surface 6c of the third frame 6 serves as a light-shielding region (frame region). In the above-described aspect, the light adjustment panel 1 fitted to the first frame 4, the light adjustment panel 1 fitted to the second frame 5A, the light adjustment panel 1 fitted to the second frame 5B, and the light adjustment panel 1 fitted to the second frame 5C are each rotated by 45° in the circumferential direction when viewed in the Z direction but may be rotated, for example, by 90° or 180°.

Figure 19:
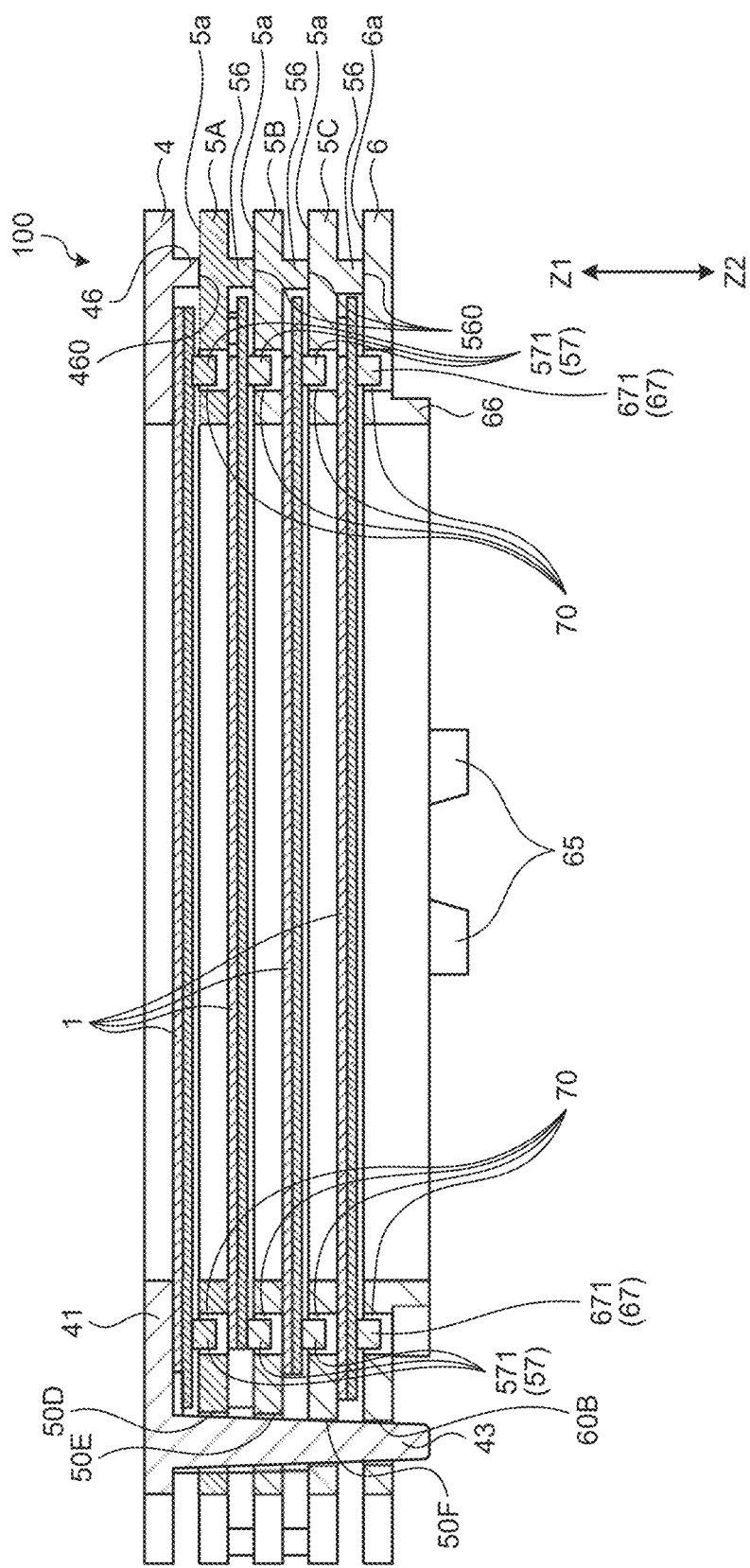
FIG. 19 is a sectional view of FIG. 1.

FIG. 19 is a sectional view of FIG. 1. FIG. 20 is an enlarged schematic diagram of part of a side surface in FIG. 1.

As illustrated in FIG. 19, the second rod 43 of the first frame 4 penetrates through the through-hole 50D of the second frame 5A, the through-hole 50E of the second frame 5B, the through-hole 50F of the second frame 5C, and the through-hole 60B of the third frame 6. Similarly, although not illustrated, the first rod 42 penetrates through through-holes of the second frames 5A, 5B, and 5C and a through-hole of the third frame 6.

The first frame 4, the second frames 5A, 5B, and 5C, and the third frame 6 may be each joined to the light adjustment panel 1 through an optical bonding agent. Moreover, light adjustment panels 1 adjacent to each other in the Z direction may be joined together by an optical bonding agent, but no bonding agent nor the like may be provided.

As illustrated in FIG. 19, the height of the protruding part 46 of the first frame 4 in the Z direction is larger than the thickness of each light adjustment panel 1. A distal end 460 of the protruding part 46 on the Z2 side contacts the front surface 5a of the second frame 5A. The height of each protruding part 56 of the second frame 5A in the Z direction is larger than the thickness of each light adjustment panel 1. A distal end 560 of each protruding part 56 on the Z2 side contacts the front surface 5a of the second frame 5B. The height of each protruding part 56 of the second frame 5B in the Z direction is larger than the thickness of each light adjustment panel 1. A distal end 560 of each protruding part 56 on the Z2 side contacts the front surface 5a of the second frame 5C. The height of each protruding part 56 of the second frame 5C in the Z direction is larger than the thickness of each light adjustment panel 1. A distal end 560 of each protruding part 56 on the Z2 side contacts the front surface 6a of the third frame 6.

As illustrated in FIG. 20, the light adjustment panel 1 is disposed between the back surface 5b of the second frame 5A and the front surface 5a of the second frame 5B. The second hooks 58 extend toward the Z2 side from the back surface 5b. Each second hook 58 includes a body part 58b, a protrusion 58a, and a distal end part 58c, and accordingly, the body parts 58b, the protrusions 58a, and the distal end parts 58c are provided in pairs. Each body part 58b extends toward the Z2 side from the back surface 5b. Each protrusion 58a protrudes laterally from a side surface of the corresponding body part 58b on the Z2 side. Each protrusion 58a has a substantially triangular shape when viewed in the radial direction of the light adjustment device 100. The protrusions 58a are inserted into the first cutouts 52 of the second frame 5B and hooked on the back surface 5b of the second frame 5B. Accordingly, the second frame 5A is coupled to the second frame 5B with the light adjustment panel 1 disposed between the second frames 5A and 5B.

The second frame 5C is disposed on the Z2 side of the second frame 5B. The distal end parts 58c of the second hooks 58 are inserted into the first cutouts 53 of the second frame 5C. The light adjustment panel 1 disposed between the second frame 5C and the third frame 6 is separated from the distal end parts 58c of the second hooks 58 in the Z direction.

As described above, the light adjustment device 100 according to the present embodiment includes the first frame 4, the second frame 5, the third frame 6, and a plurality of the light adjustment panels 1. The first frame 4, the second frame 5, and the third frame 6 have annular shapes and are stacked in the Z direction (first direction). The number of the second frames 5 is at least one. The second frame 5 is disposed on the Z2 side (one side in the first direction) of the first frame 4, and the third frame 6 is disposed on the Z2 side of the second frame 5. The first frame 4 includes the first hooks 44 and 45 that protrude to the Z2 side. The second frame 5 includes the first cutouts 52, 53, 54, and 55 into which the first hooks 44 and 45 are hooked, and the second hooks 58 and 59 that protrude to the Z2 side. The third frame 6 includes the second cutouts 62 and 63 into which the second hooks 58 and 59 are hooked. The first hooks 44 and 45 do not overlap the second hooks 58 and 59 when viewed in the Z direction. One of the light adjustment panels 1 is disposed between the first frame 4 and the second frame 5 and another of the light adjustment panels 1 is disposed between the second frame 5 and the third frame 6.

In this manner, the first frame 4 is coupled to the second frame 5, and the second frame 5 is coupled to the third frame 6. One of the light adjustment panels 1 is disposed between the first frame 4 and the second frame 5, and another of the light adjustment panels 1 is disposed between the second frame 5 and the third frame 6. Therefore, the light adjustment panel 1 disposed between the first frame 4 and the second frame 5 and the light adjustment panel 1 disposed between the second frame 5 and the third frame 6 are unlikely to have a positional misalignment in the X and Y directions intersecting the Z direction (stacking direction). Thus, decrease of an active area (light transmission region) when the light adjustment device 100 is viewed in the up-down direction is suppressed.

The second frame 5 includes the arms 57 (first arms) that contact the light adjustment panel 1 disposed between the first frame 4 and the second frame 5. The third frame 6 includes the arms 67 (second arms) that contact the light adjustment panel 1 disposed between the second frame 5 and the third frame 6.

In this manner, since the arms 57 and 67 each contact the corresponding light adjustment panel 1 disposed between the frames, the light adjustment panel 1 is pressed to the Z1 side and unlikely to move to the Z2 side. Accordingly, the own weight of the light adjustment panel 1 is unlikely to be applied to the first hooks 44 and 45 of the first frame 4 that are hooked into the first cutouts 52, 53, 54, and 55 of the second frame 5, and the own weight of the light adjustment panel 1 is unlikely to be applied to the second hooks 58 and 59 of the second frame 5 that are hooked into the second cutouts 62 and 63 of the third frame 6. Thus, durability of the first hooks 44 and 45 and the second hooks 58 and 59 improves.

The first frame 4 includes the first rod 42 and the second rod 43 (rod) protruding to the Z2 side. The second frame 5 and the third frame 6 are provided with the through-holes 50 and the through-holes 60, respectively, through which the first rod 42 and the second rod 43 penetrate.

Thus, a positional misalignment of the second frame 5 and the third frame 6 relative to the first frame 4 is unlikely to occur in the X and Y directions intersecting the Z direction.

The light adjustment device includes a plurality of the second frames 5, and each of the second frames 5 includes the first cutouts 52, 53, 54, and 55 and the second hooks 58 and 59. Of two of the second frames 5 adjacent to each other in the Z direction, the second hooks 58 and 59 of the second frame 5 on the Z1 side (other side in the first direction) are hooked into the first cutouts 52, 53, 54, and 55 of the second frame 5 on the Z2 side.

Accordingly, the second frames 5 can be provided between the first frame 4 and the third frame 6, and thus a larger number of light adjustment panels 1 can be stacked in a state in which a positional misalignment in the X and Y directions intersecting the Z direction is suppressed.

When viewed in the Z direction, the second frames 5 each have an annular shape extending in the circumferential direction about an axis at the radial center C. Of two of the second frames 5 adjacent to each other in the Z direction, the second frame 5 on the Z1 side is provided in a state of being rotated to one side (for example, in the clockwise direction when viewed from the Z1 side) in the circumferential direction relative to the second frame 5 on the Z2 side. The second hooks 58 and 59 of the second frames 5 do not overlap each other when viewed in the Z direction (first direction).

Thus, a further larger number of light adjustment panels 1 can be stacked by using the second frames 5 with the same structure in a state in which a positional misalignment in the X and Y directions intersecting the Z direction is suppressed.

As illustrated in FIG. 20, the second one (second frame 5B) of the second frames 5 is provided on the Z2 side (one side in the first direction) relative to the first one (second frame 5A) of the second frames 5, and the third one (second frame 5C) of the second frames 5 is provided on the Z2 side relative to the second frame 5B. The second hooks 58 of the second frame 5A are hooked into the first cutouts 52 of the second frame 5B, and the distal end parts 58c of the second hooks 58 are inserted into the first cutouts 53 of the second frame 5C.

When the second frames 5 are stacked, the distal end parts 58c of the second hooks 58 of the first one (second frame 5A) of the second frames 5 protrude to the Z2 side with respect to the second one (second frame 5B) of the second frames 5. However, the distal end parts 58c of the second hooks 58 are inserted into the first cutouts 53 of the third one (second frame 5C) of the second frames 5. Thus, the second frames 5A, 5B, and 5C can be stacked in the Z direction with minimized gaps therebetween.

The first frame 4 includes the protruding parts 46 and 47 and each second frame 5 includes the protruding parts 56, the protruding parts 46, 47, and 56 protruding to the Z2 side, extending along an outer edge of the corresponding light adjustment panel 1, and having a height larger than the thickness of the light adjustment panel 1. As illustrated in FIG. 19, the second frame 5A includes the arms 57 provided with the protrusions 571. Since the protrusions 571 press the light adjustment panel 1 toward the Z1 side, the light adjustment panel 1 contacts the first frame 4. Specifically, a space larger than the thickness of the light adjustment panel is generated between the back surface 4b of the first frame 4 and the front surface 5a of the second frame 5A when the distal end 460 of the protruding part 46 of the first frame 4 contacts the second frame 5A, but the light adjustment panel 1 is pressed against the first frame 4 by the protrusions 571 of the arms 57 of the second frame 5A and sandwiched between the back surface of the first frame 4 and the arms 57. Similarly, the light adjustment panel 1 provided between the second frames 5A and 5B is pressed against the second frame 5A by the protrusions 571 of the arms 57 of the second frame 5B. Similarly, the light adjustment panel 1 provided between the second frames 5B and 5C is pressed against the second frame 5B by the protrusions 571 of the arms 57 of the second frame 5C. Similarly, the light adjustment panel 1 provided between the second frame 5C and the third frame 6 is pressed against the second frame 5C by the protrusion 671 of the arms 67 of the third frame 6. In this manner, in the present embodiment, the four light adjustment panels 1 are held while being pressed by the protrusions 571 and 671 of the arms 57, 67A, 67B, 67C, and 67D, and accordingly, looseness (vibration) is prevented.

Thus, the protruding parts 46 and 47 of the first frame 4 contact a second frame 5, and the light adjustment panel 1 is disposed on the inner side of the protruding parts 46 and 47. The protruding parts 56 of the second frame 5 contacts another second frame 5 or the third frame 6, and another light adjustment panel 1 is disposed on the inner side of the protruding parts 56.

If the heights of the protruding parts 46, 47, and 56 are smaller than the thickness of each light adjustment panel 1, the protruding parts 46 and 47 of the first frame 4 are separated from a second frame 5 in the Z direction and a gap is generated between the protruding parts 46 and 47 and the second frame 5. Furthermore, the protruding parts 56 of the second frame 5 is separated from another second frame 5 or the third frame 6 in the Z direction and a gap is generated between the protruding parts 56 and the third frame 6.

As described above, in a case where the heights of the protruding parts 46, 47, and 56 are larger the thickness of each light adjustment panel 1, the first frame 4, the second frames 5, and the third frame 6 can be stacked in the Z direction with minimized gaps therebetween.

The protruding parts include the protrusions 461, 462, 463, 464, 465, 471, 472, 473, 561, 562, 563, 564, 565, 566, 567, and 568 that protrude toward the outer edge of the light adjustment panel 1 and can contact the outer edge.

Accordingly, with the protrusions, it is possible to achieve positioning of each light adjustment panel 1 in the X and Y directions. Thus, it is possible to stack the light adjustment panels 1 while reducing occurrence of a positional misalignment in the X and Y directions.

What is claimed is:

1. A light adjustment device comprising:
   a first frame;
   a second frame;
   a third frame; and
   a plurality of light adjustment panels,
   wherein the first frame, the second frame, and the third frame have annular shapes and are stacked in a first direction, and the number of the second frames is at least one,
   wherein the second frame is disposed on one side in the first direction relative to the first frame, and the third frame is disposed on the one side in the first direction relative to the second frame,
   wherein the first frame comprises a first hook that protrudes to the one side in the first direction,
   wherein the second frame comprises
      a first cutout into which the first hook is hooked, and
      a second hook that protrudes to the one side in the first direction,
   wherein the third frame comprises a second cutout into which the second hook is hooked,
   wherein the first hook does not overlap the second hook when viewed in the first direction, and
   wherein one of the light adjustment panels is disposed between the first frame and the second frame, and another of the light adjustment panels is disposed between the second frame and the third frame.

2. The light adjustment device according to claim 1, wherein the second frame includes a first arm that contacts the light adjustment panel disposed between the first frame and the second frame, and
   wherein the third frame includes a second arm that contacts the light adjustment panel disposed between the second frame and the third frame.

3. The light adjustment device according to claim 1, wherein the first frame includes a rod protruding to the one side in the first direction, and
   wherein the second frame and the third frame are each provided with a through-hole through which the rod penetrates.

4. The light adjustment device according to claim 1,
wherein the light adjustment device comprises a plurality of the second frames, and each of the second frames comprises a plurality of the first cutouts and a plurality of the second hooks,
wherein, of two of the second frames adjacent to each other in the first direction, the second hooks of the second frame on the other side in the first direction are hooked into the first cutouts of the second frame on the one side in the first direction, and
wherein one of the light adjustment panels is disposed between the second frame on the other side in the first direction and the second frame on the one side in the first direction.

5. The light adjustment device according to claim 4,
wherein when viewed in the first direction, the second frames each have an annular shape extending in a circumferential direction about an axis at a radial center,
wherein, of two of the second frames adjacent to each other in the first direction, the second frame on the other side in the first direction is provided in a state of being rotated to one side in the circumferential direction relative to the second frame on the one side in the first direction, and
wherein the second hooks of the second frames do not overlap each other when viewed in the first direction.

6. The light adjustment device according to claim 4,
wherein the light adjustment device comprises three or more of the second frames,
wherein a second one of the second frames is provided on the one side in the first direction relative to a first one of the second frames, and a third one of the second frames is provided on the one side in the first direction relative to the second one, and
wherein the second hook of the first one of the second frames is hooked into the first cutout of the second one of the second frames, and a distal end part of the second hook provided on the one side in the first direction is inserted into the first cutout of the third one of the second frames.

7. The light adjustment device according to claim 1,
wherein the first frame comprises a protruding part protruding to the one side in the first direction, extending along an outer edge of the light adjustment panel disposed between the first frame and the second frame, and having a height larger than a thickness of the light adjustment panel.

8. The light adjustment device according to claim 7,
wherein the protruding part includes a protrusion that protrudes toward the outer edge of the light adjustment panel disposed on an inner side of the protruding part and is capable of contacting the outer edge of the light adjustment panel.

9. The light adjustment device according to claim 1,
wherein the second frame comprises a protruding part protruding to the one side in the first direction, extending along an outer edge of the light adjustment panel disposed between the second frame and the third frame, and having a height larger than a thickness of the light adjustment panel.

10. The light adjustment device according to claim 9,
wherein the protruding part includes a protrusion that protrudes toward the outer edge of the light adjustment panel disposed on an inner side of the protruding part and is capable of contacting the outer edge of the light adjustment panel.

\* \* \* \* \*